(12) United States Patent
Ueda et al.

(10) Patent No.: US 6,612,760 B2
(45) Date of Patent: *Sep. 2, 2003

(54) PRINTING APPARATUS, PRINTING SYSTEM, PRINT CONTROL METHOD, AND STORAGE MEDIUM

(75) Inventors: Shigeru Ueda, Wako (JP); Akihiro Shimura, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,444

(22) Filed: Nov. 22, 1999

(65) Prior Publication Data

US 2003/0056672 A1 Mar. 27, 2003

(30) Foreign Application Priority Data

Nov. 27, 1998 (JP) ............................................ 10-352202

(51) Int. Cl.⁷ ................................................ B41J 11/44
(52) U.S. Cl. ........................................... 400/76; 400/70
(58) Field of Search .......................... 101/483; 400/582, 400/68, 67, 62, 61, 76, 70; 399/23, 21, 18, 16

(56) References Cited

U.S. PATENT DOCUMENTS

| | | | | |
|---|---|---|---|---|
| 4,353,653 A | * | 10/1982 | Zimmerman | 400/109 |
| 5,083,142 A | * | 1/1992 | Kotabe | 346/134 |
| 5,742,742 A | * | 4/1998 | Ueda | 395/109 |
| 6,010,257 A | * | 1/2000 | Petteruti et al. | 400/88 |
| 6,018,816 A | * | 1/2000 | Tateyama | 714/746 |
| 6,089,765 A | * | 7/2000 | Mori | 400/61 |
| 6,104,505 A | * | 8/2000 | Malik | 358/434 |
| 6,181,434 B1 | * | 1/2001 | Matsumoto | 358/1.13 |
| 6,188,491 B1 | * | 2/2001 | Nagashima | 358/1.9 |
| 6,244,762 B1 | * | 6/2001 | Fukano et al. | 400/61 |
| 6,327,382 B1 | * | 12/2001 | Kaneda et al. | 382/164 |

* cited by examiner

Primary Examiner—Stephen R. Funk
Assistant Examiner—Anthony H. Nguyen
(74) Attorney, Agent, or Firm—Fitzpatrick, Cella, Harper & Scinto

(57) ABSTRACT

A high-efficiency printing apparatus, a printing system, a print control method, and a storage medium require an extremely small-capacity receiving buffer memory of a printing apparatus and put an extremely small burden on a host apparatus. A PC has an IEEE 1394 interface section for communicating with a printer, a memory that can be accessed by a printer and that stores text data, and a CPU that provides the printer with an information block that includes address information of text data. The printer has an IEEE 1394 interface section for communicating with the PC, a printing section for printing on a recording medium, and a CPU that reads text data stored in the memory of the PC on the basis of an address of the information block that includes the address information of the text data provided by the PC, and causes the printing section to perform printing.

29 Claims, 35 Drawing Sheets

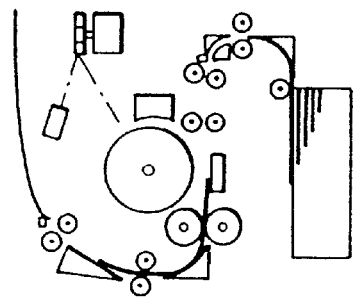
FIG. 35A (PRIOR ART)
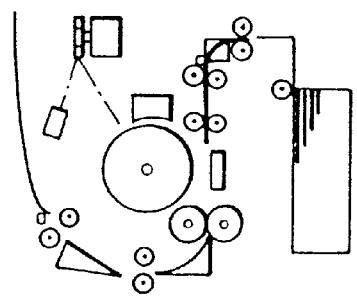
FIG. 35B (PRIOR ART)
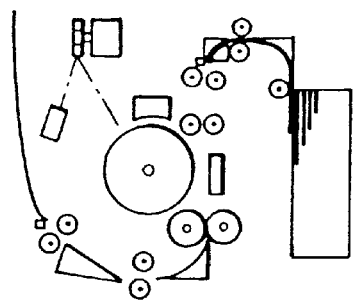
FIG. 35C (PRIOR ART)
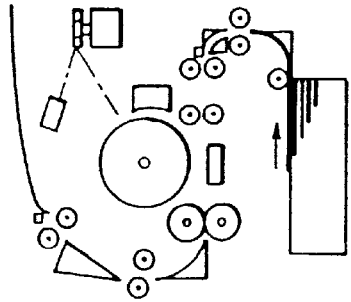
FIG. 35D (PRIOR ART)
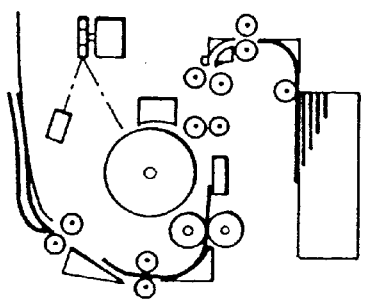
FIG. 35E (PRIOR ART)
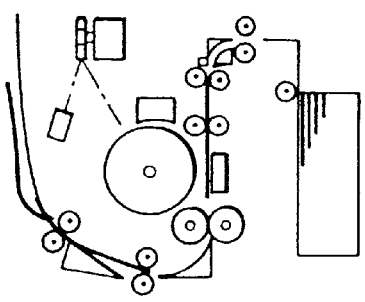
FIG. 35F (PRIOR ART)
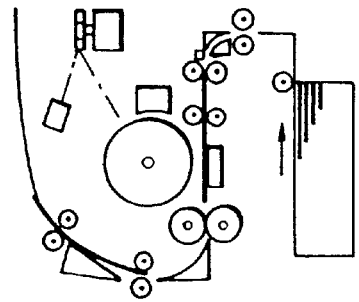
FIG. 35G (PRIOR ART)
FIG. 35H (PRIOR ART)

PRINTING APPARATUS, PRINTING SYSTEM, PRINT CONTROL METHOD, AND STORAGE MEDIUM

BACKGROUND OF THE INVENTION

1. Field of the Invention

The present invention relates to a printing apparatus, a printing system, a print control method, and a storage medium, and, more particularly, to a printing apparatus, a printing system, a print control method, and a storage medium ideally suited for performing printing that employs, as communication means, a predetermined interface such as an IEEE 1394 interface, which is a serial interface standard established by the Institute of Electrical and Electronic Engineers.

2. Description of the Related Art

Hitherto, a printing apparatus or a printer is adapted to pull out paper from a paper holding device, feed the paper to an image forming device to perform printing, and eject the paper. FIGS. 35A through 35H are schematic diagrams illustrating a series of printing steps in the printer. FIG. 35A illustrates a state wherein a first sheet of paper is being pulled out, FIG. 35B illustrates a state wherein the first sheet of paper is being fed to the image forming device, FIG. 35C illustrates another state wherein the first sheet of paper is being fed to the image forming device, FIG. 35D illustrates a state wherein the first sheet of paper for which printing has been finished is being ejected, FIG. 35E illustrates a state wherein a second sheet of paper is being printed, FIG. 35F illustrates a state wherein a third sheet of paper is being pulled out, FIG. 35G illustrates a state wherein the third sheet of paper is being printed, and FIG. 35H illustrates a state wherein a fourth sheet of paper is being pulled out.

In short, the first sheet of paper is picked up as shown in FIG. 35A and printed by undergoing the steps illustrated by FIGS. 35B, 35C, and 35D in this order. Before the first paper is ejected as shown in FIG. 35D, the second sheet of paper is picked up and printed as shown in FIG. 35E. This operation is necessary to improve the printing throughput of the printer. It can be understood that at least two sheets of paper are simultaneously present in the printer in this example.

In a conventional printing system formed of a printing apparatus or a printer and a host apparatus or a host computer, recovery from a jam that has taken place in the printing apparatus is performed according to either of the following procedures:

(A) A receiving buffer memory in the printer is provided with a capacity that is sufficient for storing text data for at least two pages. If a jam occurs, recovery from the jam is accomplished by reprinting the text data of a pertinent page that has been stored in the printer.

(B) If a jam occurs, the jam is reported to a host computer to have it retransmit the text data of the page where the jam has taken place.

However, the method of (A) presents a shortcoming of requiring a larger capacity of a receiving buffer memory of the printer, leading to higher cost. In particular, the printer will be larger, and an increase in cost would be critical in a printing system wherein its printer holds four or five sheets of paper when printing. The method of (B) has been disadvantageous in that burden on the host computer will be heavier since the host computer retransmits the text data of the page where the jam has occurred. This is especially disadvantageous because no standard system is presently available for sending text data of a jammed page from a host computer to a printer, and hence, there is no choice but to retransmit the whole text data, which is also extremely inconvenient for a user.

SUMMARY OF THE INVENTION

Accordingly, the present invention has been made with a view toward overcoming the shortcomings described above, and it is an object thereof to provide a printing apparatus, a printing system, a print control method, and a storage medium that features high efficiency, an extremely small capacity of a receiving buffer memory of the printing apparatus, and an extremely small burden on a host apparatus.

To this end, according to one aspect of the present invention, there is provided a printing apparatus that is capable of communicating with a host apparatus and includes control means for reading print data stored in the host apparatus on the basis of address information regarding the print data notified from the host apparatus in order to perform printing.

In a preferred form of the present invention, the printing apparatus includes communicating means for communicating with a host apparatus, and printing means for printing on a recording medium, wherein the control means reads print data stored in the host apparatus on the basis of an address of an information block that includes address information regarding the print data notified from the host apparatus via the communicating means, and causes the printing means to perform printing.

In another preferred form of the present invention, the control means sends a report indicating that the printing of the print data has been completed and also information regarding a page on which printing has been completed back to the host apparatus as a status via the communicating means, and the host apparatus clears print data regarding the page on which printing has been completed upon receipt of the printing complete status via the communicating means, and loads at the cleared position print data regarding a next page to be printed if there is a next page to be printed.

In a further preferred form of the present invention, upon receipt of the printing complete status via the communicating means, the host apparatus retains print data other than the print data regarding the page on which printing has been completed.

In another preferred from of the present invention, the communicating means performs communication that conforms to an IEEE 1394 interface standard.

According to another aspect of the present invention, there is provided a printing system including a printing apparatus and a host apparatus that are able to communicate with each other, wherein the host apparatus has storing means that can be accessed by the printing apparatus and stores print data, and host control means for notifying the printing apparatus of address information of print data, wherein the printing apparatus includes print control means for reading print data stored in the storing means of the host apparatus on the basis of address information of the print data notified from the host apparatus, and causes printing to be performed.

In a preferred form of the present invention, the host apparatus includes host communicating means for communicating with a printing apparatus, and the printing apparatus includes print communicating means for communicating with the host apparatus and printing means for printing on a recording medium, wherein the print control means reads print data stored in the storing means of the host apparatus on the basis of an address of an information block that includes address information regarding the print data notified from the host apparatus via the print communicating means, and causes the printing means to perform printing.

In another preferred form of the present invention, the print control means sends a report indicating that the printing of the print data has been completed and also information regarding a page on which printing has been completed back, as a status, to the host apparatus via the print communicating means, and the host control means clears print data regarding the page on which printing has been completed from the storing means upon receipt of a printing complete status via the host communicating means, and loads, at the cleared position in the storing means print, data regarding a next page to be printed if there is a next page to be printed.

In a further preferred form of the present invention, upon receipt of the printing complete status via the host communicating means, the host control means retains, in the storing means, print data other than the print data regarding the page on which printing has been completed.

In another preferred form of the present invention, the host communicating means and the print communicating means perform communication that conforms to an IEEE 1394 interface standard.

In a further preferred form of the present invention, an image input device such as a scanner, an image sensing device such as a digital camera, a storing device such as a hard disk, and so on other than the printing apparatus may be connected to the host apparatus via the IEEE 1394 interface.

According to yet another aspect of the present invention, there is provided a print control method applied to a printing system that includes a printing apparatus and a host apparatus that are able to communicate with each other, wherein the host apparatus performs a storing step for storing print data in storing means that can be accessed by the printing apparatus, and a host control step for notifying the printing apparatus of address information of print data, and the printing apparatus performs a print control step for reading print data stored in the storing means of the host apparatus on the basis of address information of the print data notified from the host apparatus, and for causing printing to be performed.

In a preferred form of the present invention, the host apparatus performs a host communication step for communicating with a printing apparatus, and the printing apparatus performs a print communication step for communicating with the host apparatus and a printing step for printing on a recording medium, wherein, in the print control step, print data stored in the storing means of the host apparatus is read on the basis of an address of an information block that includes address information regarding the print data notified from the host apparatus via the print communication step, and the printing is performed in the printing step.

In another preferred form of the present invention, in the print control step, a report indicating that the printing of the print data has been completed and also information regarding a page on which printing has been completed are sent back to the host apparatus as a status via the print communication step, and in the host control step, print data regarding the page on which printing has been completed is cleared from the storing means upon receipt of a printing complete status via the host communication step, and print data regarding a next page to be printed is loaded at the cleared position in the storing means if there is a next page to be printed.

In a further preferred form of the present invention, print data other than the print data regarding the page on which printing has been completed is retained in the storing means in the host control step upon receipt of the printing complete status via the host communicating step.

In another preferred form of the present invention, communication that conforms to an IEEE 1394 interface standard is performed in the host communication step and the print communication step.

In a further preferred form of the present invention, the print control method is applicable to a printing system wherein an image input device such as a scanner, an image sensing device such as a digital camera, a storing device such as a hard disk, and so on other than the printing apparatus can be connected to the host apparatus via the IEEE 1394 interface.

According to a further aspect of the present invention, there is provided a storage medium that stores a program for implementing a print control method applied to a printing system that includes a printing apparatus and a host apparatus that are able to communicate with each other and that can be accessed by a computer, wherein the print control method includes a storing step for storing print data in storing means that can be accessed by the printing apparatus, a host control step for notifying the printing apparatus of address information of the print data, and a print control step for reading the print data stored in the storing means of the host apparatus on the basis of the address information of the print data notified from the host apparatus and for carrying out printing.

BRIEF DESCRIPTION OF THE DRAWINGS

FIG. 7 illustrates a print start command and a print end status in the printing system according to the embodiment of the present invention, wherein

FIG. 28 is a block diagram for explaining arbitration, wherein

FIG. 35 provides schematic diagrams showing a flow of paper in a printing process in a printer, wherein FIG. 35A is a schematic diagram illustrating a state wherein a first sheet of paper is being pulled out, FIG. 35B is a schematic diagram illustrating a state wherein the first sheet of paper is being fed to an image forming device, FIG. 35C is a schematic diagram illustrating another state wherein the first sheet of paper is being fed to the image forming device, FIG. 35D is a schematic diagram illustrating a state wherein the first sheet of paper for which printing has been finished is being ejected, FIG. 35E is a schematic diagram illustrating a state wherein a second sheet of paper is being printed, FIG. 35F is a schematic diagram illustrating a state wherein a third sheet of paper is being pulled out, FIG. 35G is a schematic diagram illustrating a state wherein the third sheet of paper is being printed, and FIG. 35H is a schematic diagram illustrating a state wherein a fourth sheet of paper is being pulled out.

DESCRIPTION OF THE PREFERRED EMBODIMENT

Embodiments of the present invention will now be described in conjunction with the accompanying drawings.

The embodiment of the present invention is a new printing system that makes use of the characteristics of an IEEE 1394 interface (I/F) bus in order to overcome the shortcomings of the prior art set forth above.

Figure 3:
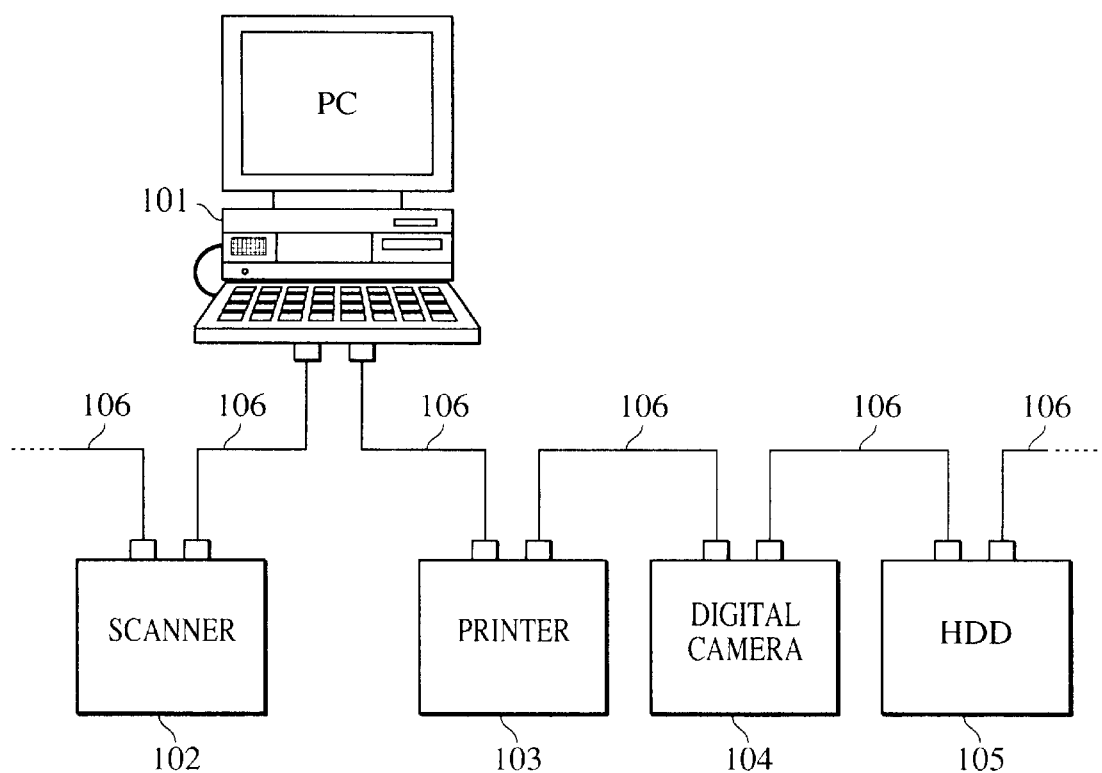
FIG. 3 is a block diagram showing an entire configuration of the printing system according to the embodiment of the present invention.

FIG. 3 is a block diagram showing an entire configuration of a printing system in accordance with an embodiment of the present invention. The printing system according to the embodiment of the invention is equipped with a personal computer (PC) 101, a scanner 102, a printer 103, a digital camera 104, and a hard disk drive (hereinafter referred to as "HDD") 105. Reference numeral 106 in the drawing denotes an IEEE 1394 interface serial bus. The system configuration shown in FIG. 3 is an example; the present invention is not limited to the shown configuration.

The following will describe the functions of the respective component units. The PC 101 controls the foregoing devices via the IEEE 1394 interface serial bus 106. The details of the configuration thereof will be discussed later in conjunction with FIG. 2. The scanner 102 is used to input images of documents. The printer 103 performs printing on a recording medium such as paper in accordance with a print start instruction received from the PC 101. The details of the configuration thereof will be discussed later in conjunction with FIG. 1. The digital camera 104 is used as an image sensing device. An HDD 105 writes/reads a variety of data under control of the PC 101.

The embodiment of the present invention employs an IEEE 1394 interface serial bus as a digital interface for connecting devices. Therefore, the IEEE 1394 interface serial bus will be first described.

The advent of home digital VTRs or digital versatile discs (DVDs) has led to a need to support of real-time data transfer of a large quantity of information such as video data and audio data. Transferring such video data and audio data in a real-time mode and capturing the data into a PC or transferring the data to other digital equipment require an interface capable of high-speed data transfer. The IEEE 1394-1995 bus, which is a high-performance serial bus (hereinafter referred simply to "1394 serial bus"), is an interface that has been developed to meet the aforesaid need.

Figure 18:
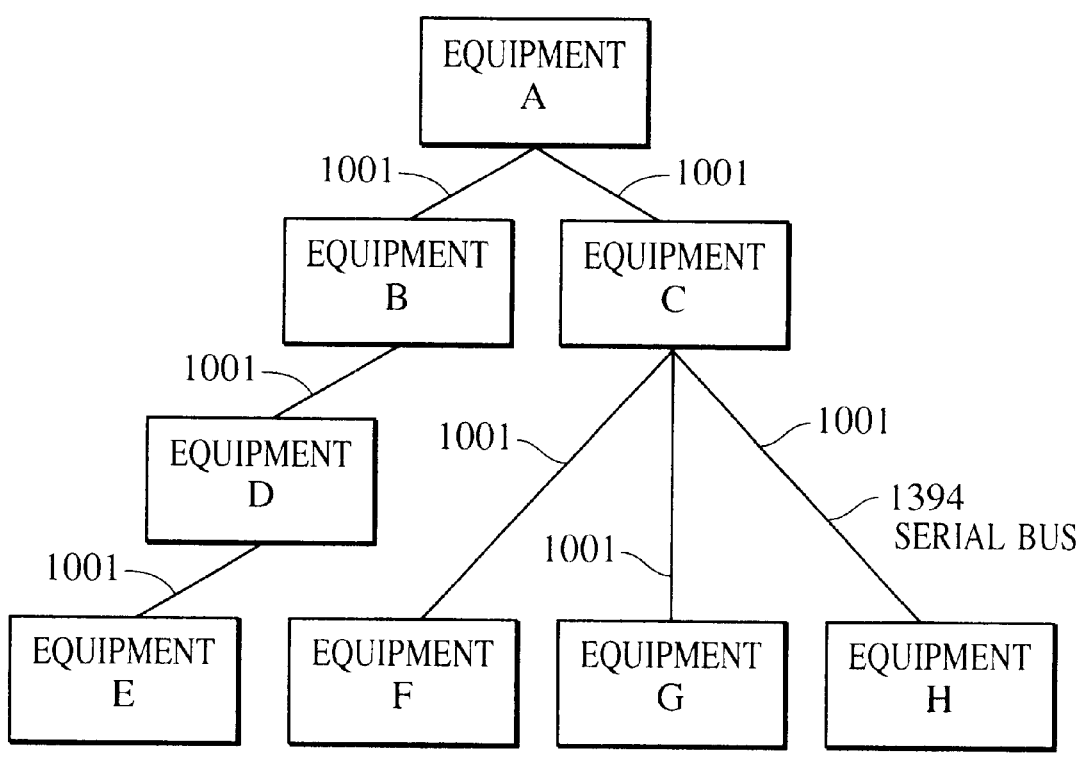
FIG. 18 is a block diagram showing an example of a network system constructed by using a 1394 serial bus.

FIG. 18 shows an example of a network system configured using the 1394 serial bus. The network system is provided with equipment or devices A, B, C, D, E, F, G, and H. Twisted pair cables 1001 of the 1394 serial buses are used to connect between devices A and B, between devices A and C, between devices B and D, between devices D and E, between devices C and F, between devices C and G, and between devices C and H. Devices A through H are, for example, PCs, digital VTRs, DVDs, digital cameras, HDDs, monitors, and so on. The connections between the devices permit combined use of a daisy-chain method and a node branch method to enable connection with high flexibility. Each device has its own ID for mutual recognition thereby to configure a network in the range wherein they are connected with the 1394 serial buses.

Merely connecting the respective digital devices with the 1394 serial buses in sequence causes each device to provide a relay function, configuring a single network as a whole. Moreover, a plug & play feature (for automating the settings of the IRQ or I/O port addresses or the like of a variety of boards connected to a PC main unit), which is one of the characteristics of the 1394 serial bus, makes it possible to automatically recognize equipment or its connected state or the like the moment the cable is connected to the equipment.

In the network system shown in FIG. 18, if certain equipment has been removed from the network or new equipment has been added to the network, bus resetting will be accomplished automatically, and the previous network configuration will be reset to reconfigure a new network. This feature makes it possible to always set and recognize the configuration of an updated network. The network system has data transfer speeds of 100/200/400 Mbps (bits per second). Equipment having a higher transfer speed supports equipment of a lower transfer speed to accomplish compatibility.

The data transfer modes include an asynchronous transfer mode for transferring control signals or other types of asynchronous data (hereinafter referred to as "Async data"), and an isochronous transfer mode for transferring real-time video data, audio data, or other types of isochronous data (hereinafter referred to as "Iso data"). In each cycle (regular one cycle: 125 $\mu$s), the Async data and the Iso data follow the transfer of a cycle start packet (CSP) indicating a cycle start, and are transferred while coexisting, with priority being given to the transfer of the Iso data.

Figure 19:
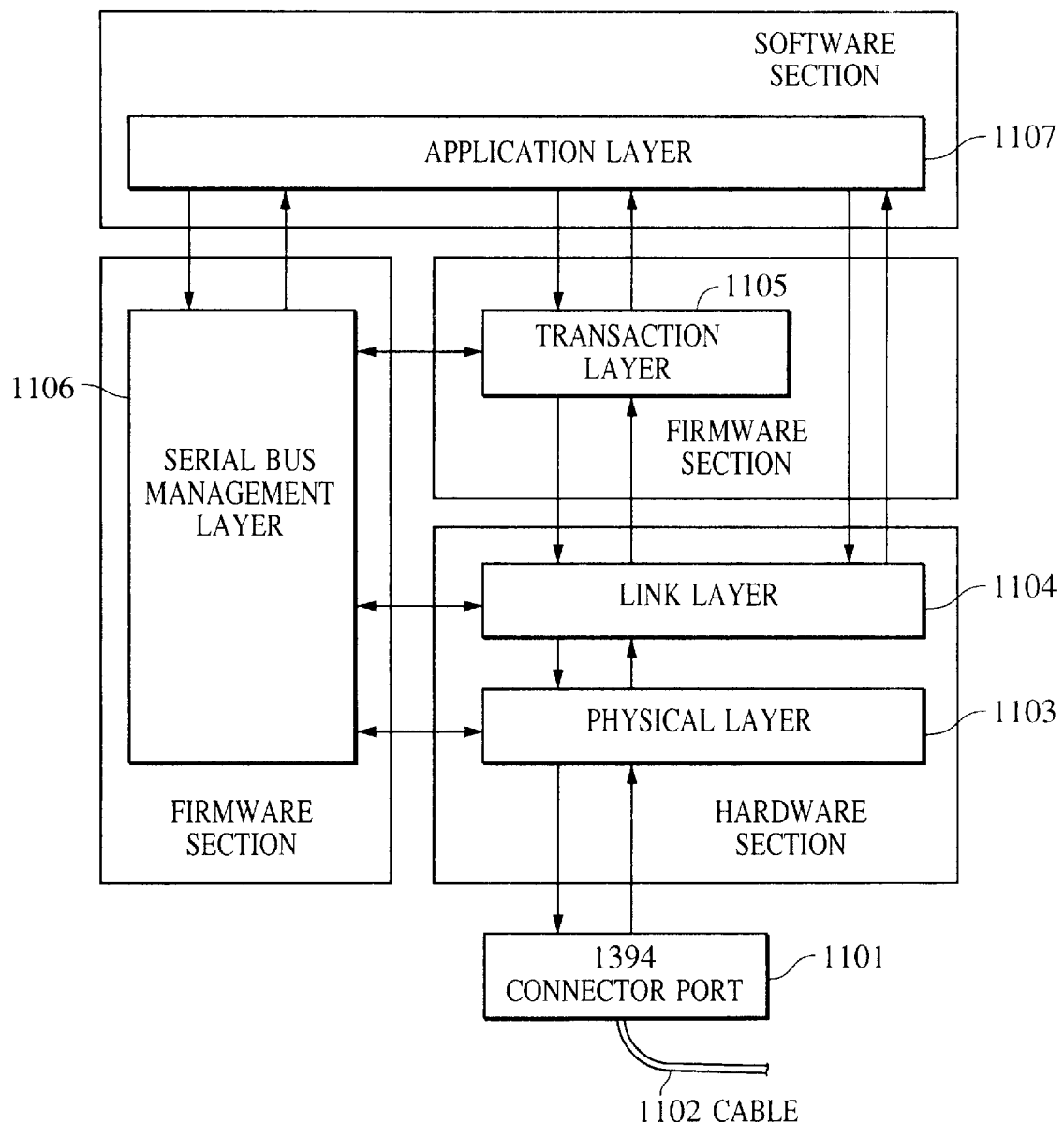
FIG. 19 is a block diagram showing components of the 1394 serial bus.

FIG. 19 shows components of the 1394 serial bus. The 1394 serial bus has a layer or hierarchy structure as a whole. Referring to FIG. 19, the structure includes a mostly hardware-like component, namely, a cable 1102 of the 1394 serial bus, a connector port 1101 to which a connector of the cable 1102 is connected, and a physical layer 1103 and a link layer 1104 as hardware components that are located in a hardware section. The hardware section is a substantial interface chip section, wherein the physical layer 1103 thereof primarily performs coding and control of connector-related components, and the link layer 1104 primarily performs packet transfer and control of cycle time.

A transaction layer 1105 of a firmware section processes data to be transferred or transacted, and issues instructions such as read and write. A serial bus management layer 1106 manages a connection state and an ID of each connected device, and is responsible for the management of the configuration of a network. The component units up through the hardware and the firmware sections substantially constitute the 1394 serial bus. An application layer 1107 of a software section differs depending on the software used, and it specifies how data is to be loaded on an interface by a protocol such as an AV protocol. The 1394 serial bus is configured as set forth above.

Figure 20:
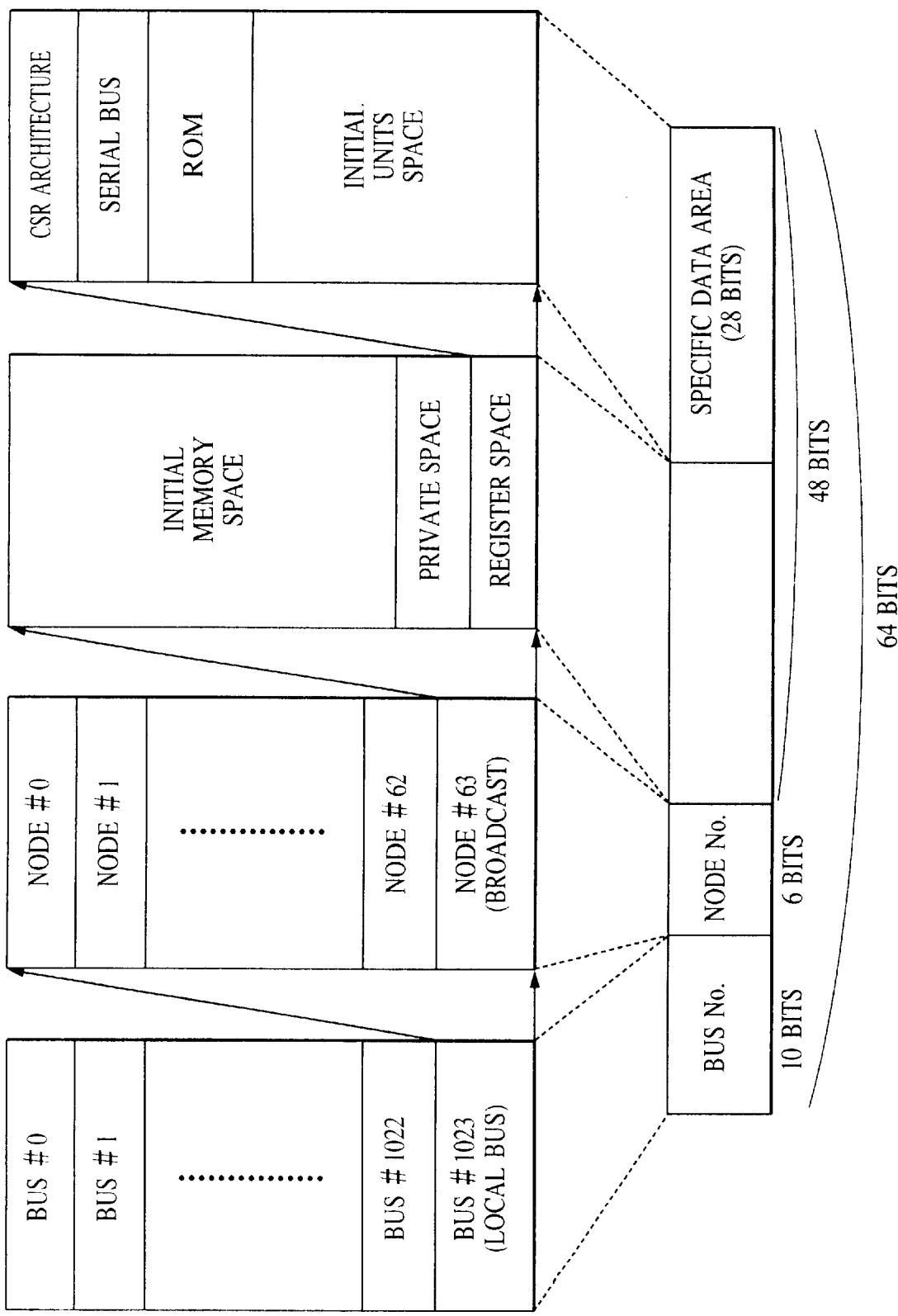
FIG. 20 is a schematic representation showing an address space in the 1394 serial bus.

Referring now to FIG. 20, an address space in the 1394 serial bus will be described. Each equipment or node connected to the 1394 serial bus is always provided with a 64-bit address specific to each node. Storing these addresses in a ROM makes it possible to always recognize the node addresses of themselves or partners and to specify a partner to communicate with. The addressing of the 1394 serial bus conforms with the IEEE 1212 standard. Address setting is such that the first 10 bits specify a bus number, the next 6 bits specify a node ID number, and the remaining 48 bits provide an address width assigned to equipment that can be used as a unique address space. The last 28 bits provide a unique data area for mainly storing information for identifying each equipment or for specifying operation conditions thereof.

This completes the technological outline of the 1394 serial bus.

Figure 21:
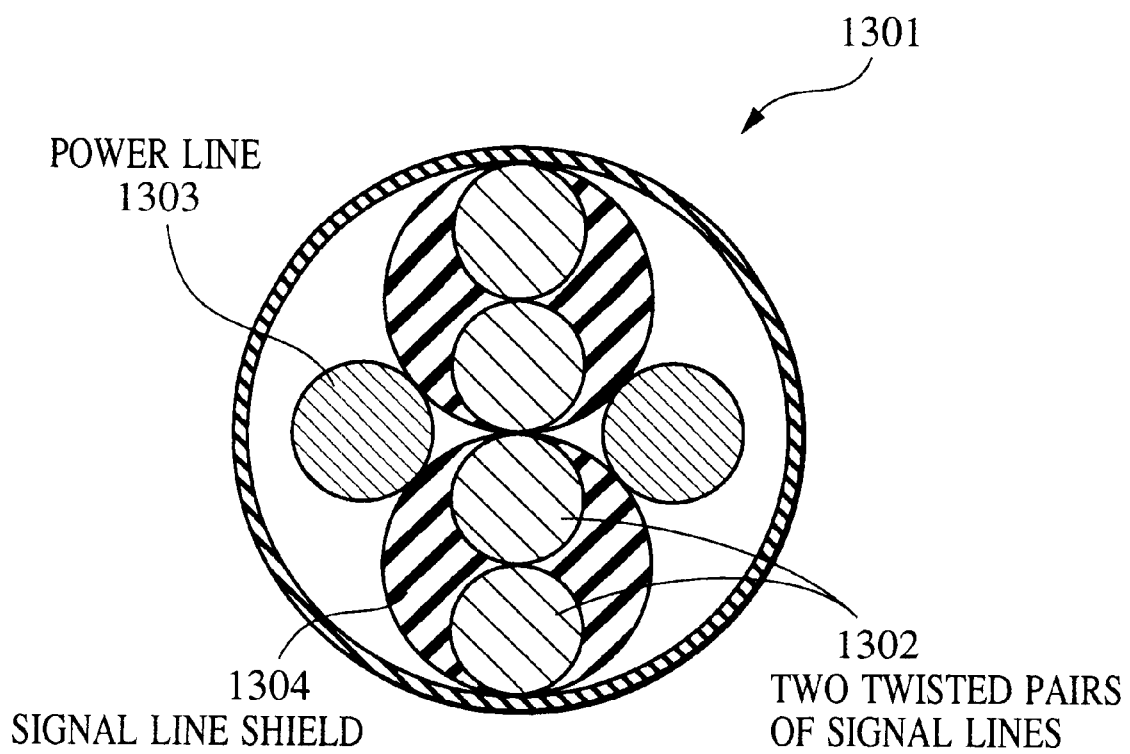
FIG. 21 is a sectional view showing a 1394 serial bus cable.

Technological features of the 1394 serial bus will now be described in further detail. FIG. 21 is a sectional view showing the 1394 serial bus cable 1301. The 1394 serial bus is provided with a power line 1303 in addition to two twisted pairs of signal lines 1302 in a connection cable thereof. Reference numeral 1304 in the drawing denotes a signal line shield. This arrangement makes it possible to supply power to equipment with no power supply or equipment that has incurred a voltage drop due to a failure. The rated line voltage applied to the power line 1303 ranges from 8 to 40 volts, and a maximum rated current passing therethrough is 1.5 amperes DC.

Figure 22:
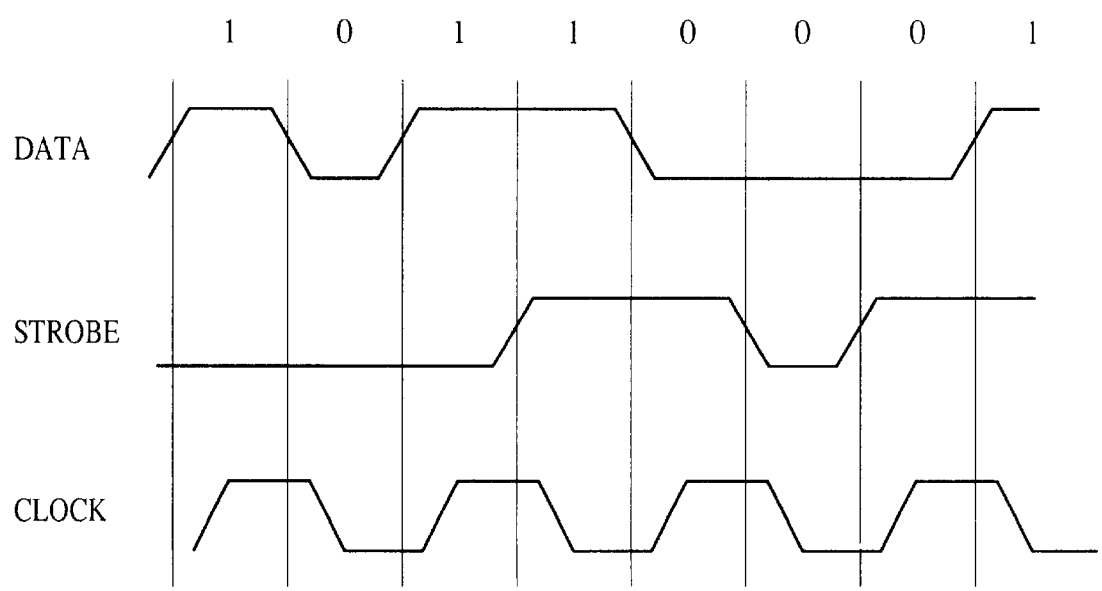
FIG. 22 is a schematic representation showing a DS-Link coding system of a data transfer format adopted by the 1394 serial bus.

Referring to FIG. 22, a data/strobe link (DS-Link) coding method of a data transfer format employed in the 1394 serial bus will now be described. The DS-Link coding method used for the 1394 serial bus is suited for high-speed serial data communication, and the DS-Link coding method requires two signal lines. Main data is transmitted to one of the twisted pair lines, while a strobe signal is transmitted to the other line. On a receiving side, a clock can be reproduced by obtaining an exclusive logical OR of the received data and strobe.

The DS-Link coding method is advantageous in that it provides a higher transfer efficiency compared with other serial data transfer methods, permits the circuit scale of a controller LSI to be reduced because a phase locked loop (PLL) circuit is no longer necessary, and enables a transceiver circuit of each device to be placed in a sleep mode because there is no need to send information indicating an idle mode when no data to be transferred is present, thus permitting lower power consumption.

In the 1394 serial bus, a node ID is assigned to each connected device or node so as to be recognized in a network configuration. When the network configuration is changed by, for example, inserting or removing a node or adding or reducing the number of nodes by turning ON/OFF a power supply, so that an updated network configuration must be recognized, an individual node that recognizes such a change transmits a bus reset signal onto the bus to set a mode for recognizing the updated network configuration. The change is detected by detecting a change in a bias voltage on a 1394 port board.

When a bus reset signal is transmitted from a certain node, the physical layer 1103 of another node receives the bus reset signal and also notifies the link layers 1104 of the occurrence of the bus reset and transmits the bus reset signal to another node. When all nodes have finally detected the bus reset signal, the bus reset is started. The bus reset is triggered by connection or disconnection of a cable, a network failure, or other types of hardware-related changes, or by an instruction directly issued to the physical layer 1103 by host control from a protocol. Whenever the bus reset is started, data transfer is interrupted and suspended. After completion of the bus reset, the data transfer is restarted.

This completes the description of the bus resetting sequence.

Following a bus reset, each node starts to assign an ID to each node in order to make up a new network configuration. A typical sequence from a bus reset to the decision of a node ID will be described with reference to the flow charts of FIG. 23, FIG. 24, FIG. 25, and FIG. 26. The flow chart of FIG. 23 shows a series of operations of a bus from the occurrence of a bus reset to a step wherein a node ID has been decided and data transfer can be implemented.

First, in step S2301, the program always monitors for the occurrence of a bus reset in a network, and if the program finds that a bus reset has taken place due to turning power ON/OFF of a node, then it proceeds to step S2302. In step S2302, a set membership between directly connected nodes is declared in order to find a new network connection following the reset of the network. After the set memberships among all nodes are established in step S2303, a single root is decided in step S2304. The declaration of the set memberships in step S2302 is continued and no root is decided until the set memberships among all nodes have been established.

When the root is decided in step S2304, a setting operation of node IDs to be assigned to the individual nodes is carried out in step S2305. The node IDs are set according to a predetermined node order, and the setting operation is repeated until IDs are assigned to all nodes. Lastly, it is determined in step S2306 that IDs have been registered in all nodes, which means that the new network configuration has been recognized by all nodes. In step S2307, data transfer among nodes becomes ready, and data transfer is begun. When the state of step S2307 is obtained, the mode is set again in which the occurrence of a bus reset is monitored. If a bus reset occurs, then the setting procedure from step S2301 to step S2306 is repeated.

Figure 23:
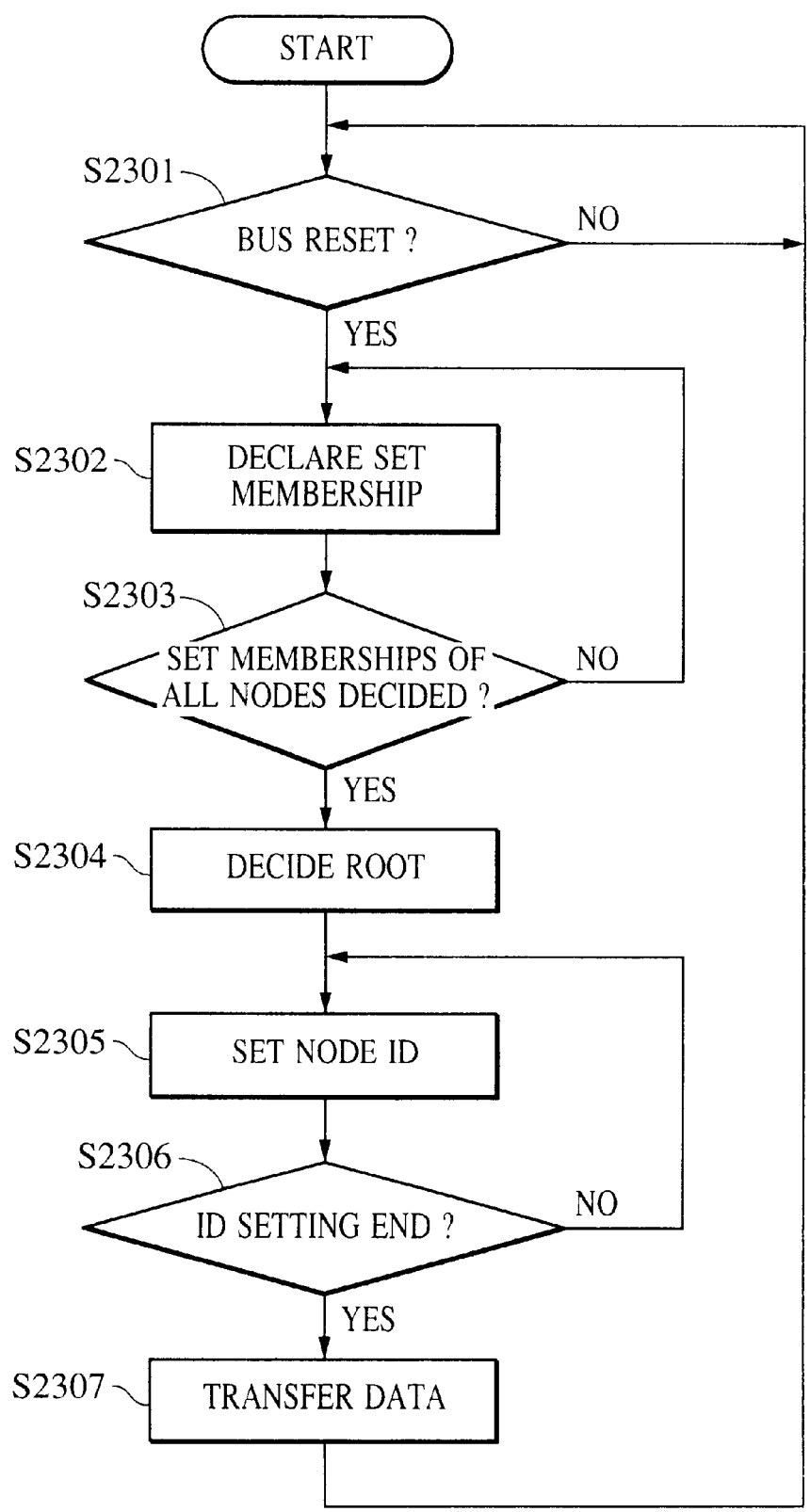
FIG. 23 is a flow chart illustrating a series of bus operation steps starting from a bus reset and proceeding through determination of a node ID until data is ready to be transferred.

The above is the description of the flow chart shown in FIG. 23. Detailed flow charts of a portion from a bus reset to the decision of a root and a portion after the decision of the root to the end of ID setting of the flow chart shown in FIG. 23 are given in FIGS. 24, 25, and 26. First, the description will be given of the flow chart of FIG. 24.

If a bus reset occurs in step S2401, then the network configuration is reset once. In step S2401, the program constantly monitors for the occurrence of a bus reset. Next, in step S2402, a flag is set at each device to indicate that each device is a leaf or node, as a first step of re-recognizing the connection state of the reset network. Further in step S2403, each device checks how many of its ports are connected to other nodes. Based on a result of checking the number of ports obtained in step S2404, the number of undefined ports, i.e. the number of ports on which no set memberships have been established, is checked before starting the declaration of set memberships. Immediately after a bus reset, the number of ports equals the number of undefined ports, but as the set memberships are decided, the number of the undefined ports detected in step S2404 changes.

Immediately following a bus reset, only leaves are allowed to declare set memberships first. The leaves can be known by checking the number of ports in step S2403. In step S2405, a leaf declares "I am a child, and you are a parent" to a node connected to itself, and terminates the operation. A node which recognizes in step S2403 that it has a plurality of ports and that it is a branch proceeds to step S2406 wherein a flag indicating a branch is set first, because the number of undefined ports is larger than 1 in step S2404 immediately after the bus reset. In step S2407, the node waits for accepting parenthood in the declaration of a set membership from a leaf.

When a leaf declares a set membership and a branch accepts the declaration in step S2407, the branch checks the number of undefined ports of step S2404 as necessary. If the number of undefined ports has reached 1, then the branch is able to declare "I am a child" of step S2405 to a node connected to the remaining port. From the second time and after, a branch that is found to have two or more undefined ports in step S2404 waits for accepting parenthood from a leaf or other branch in step S2407 again.

Figure 24:
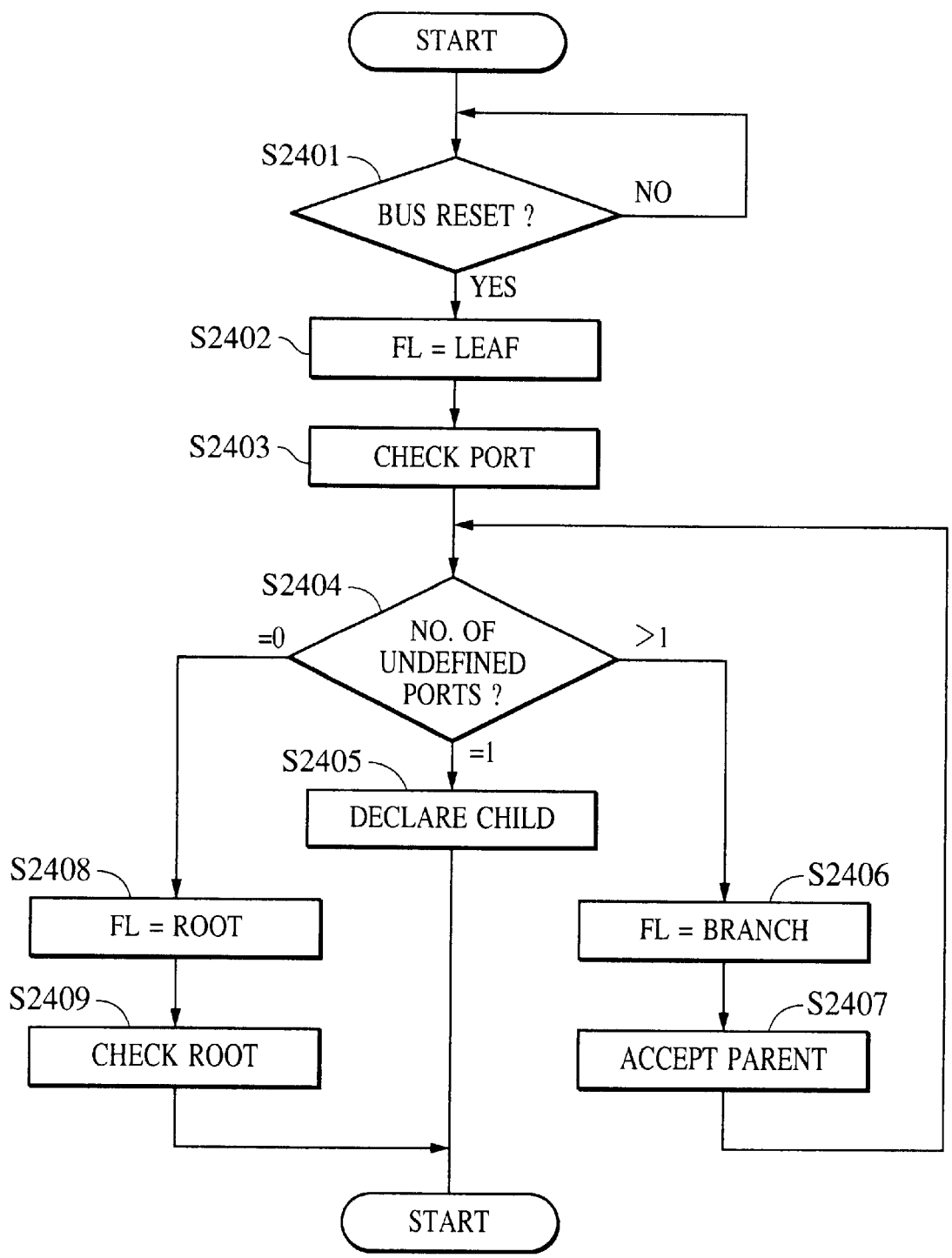
FIG. 24 is a flow chart showing more details of a procedure portion from the bus reset to determination of a root and a procedure until ID setting is completed after the root is decided.

Lastly, the number of undefined ports of any branch or exceptionally leaf (because it has failed to act quickly although it could have declared to be a child) checked in step S2404 has reached zero, this completes the declaration of the set memberships of the entire network. The only node, the number of undefined ports of which has reached zero (all ports thereof have been defined), sets a root flag in step S2408, and recognizes itself as a root in step S2409. Thus, the procedure from the bus reset to the declaration of set memberships among all nodes in the network shown in FIG. 24 is completed.

Figure 25:
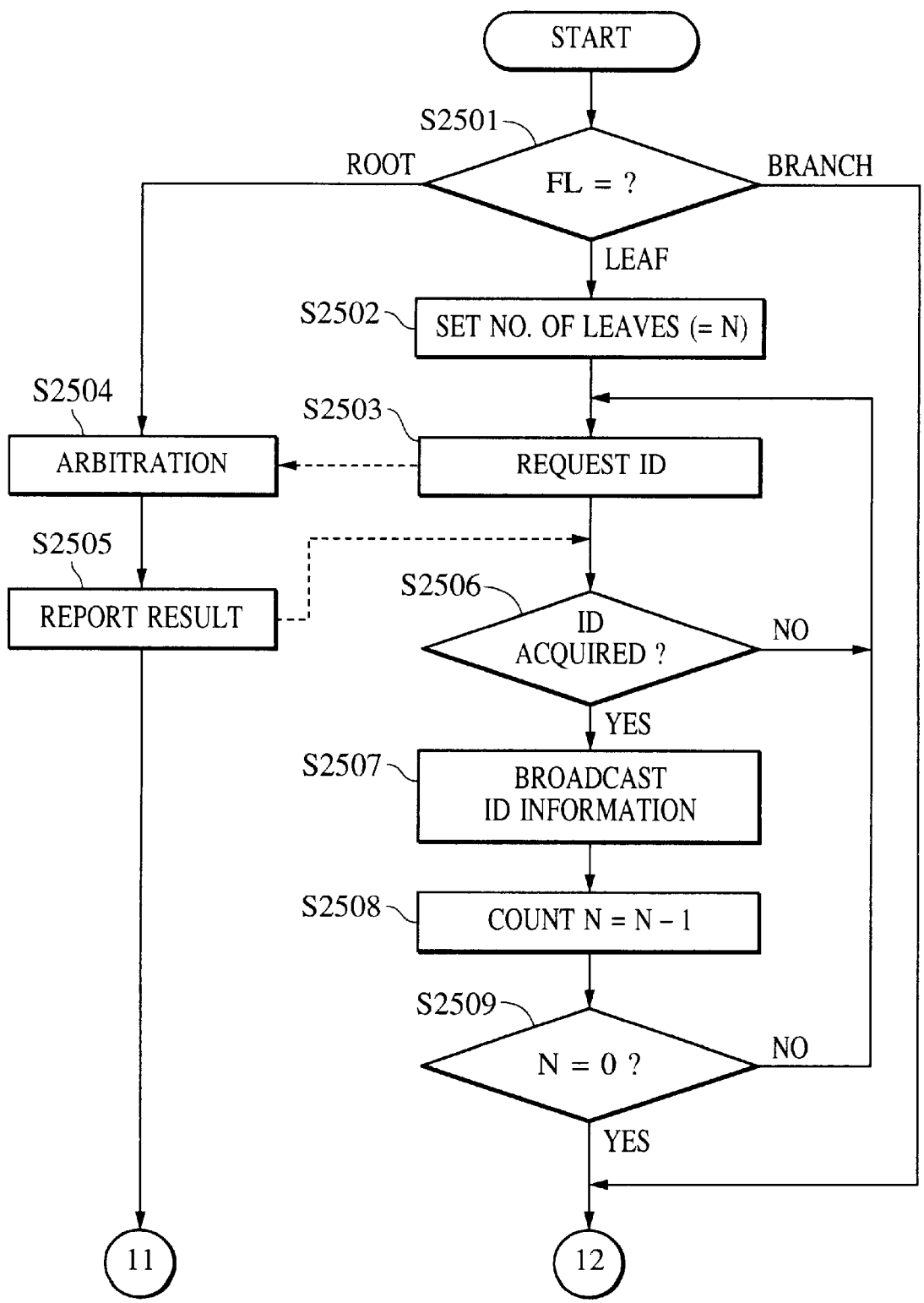
FIG. 25 is a flow chart showing more details of a procedure portion from the bus reset to determination of a root and a procedure until ID setting is completed after the root is decided.
Figure 26:
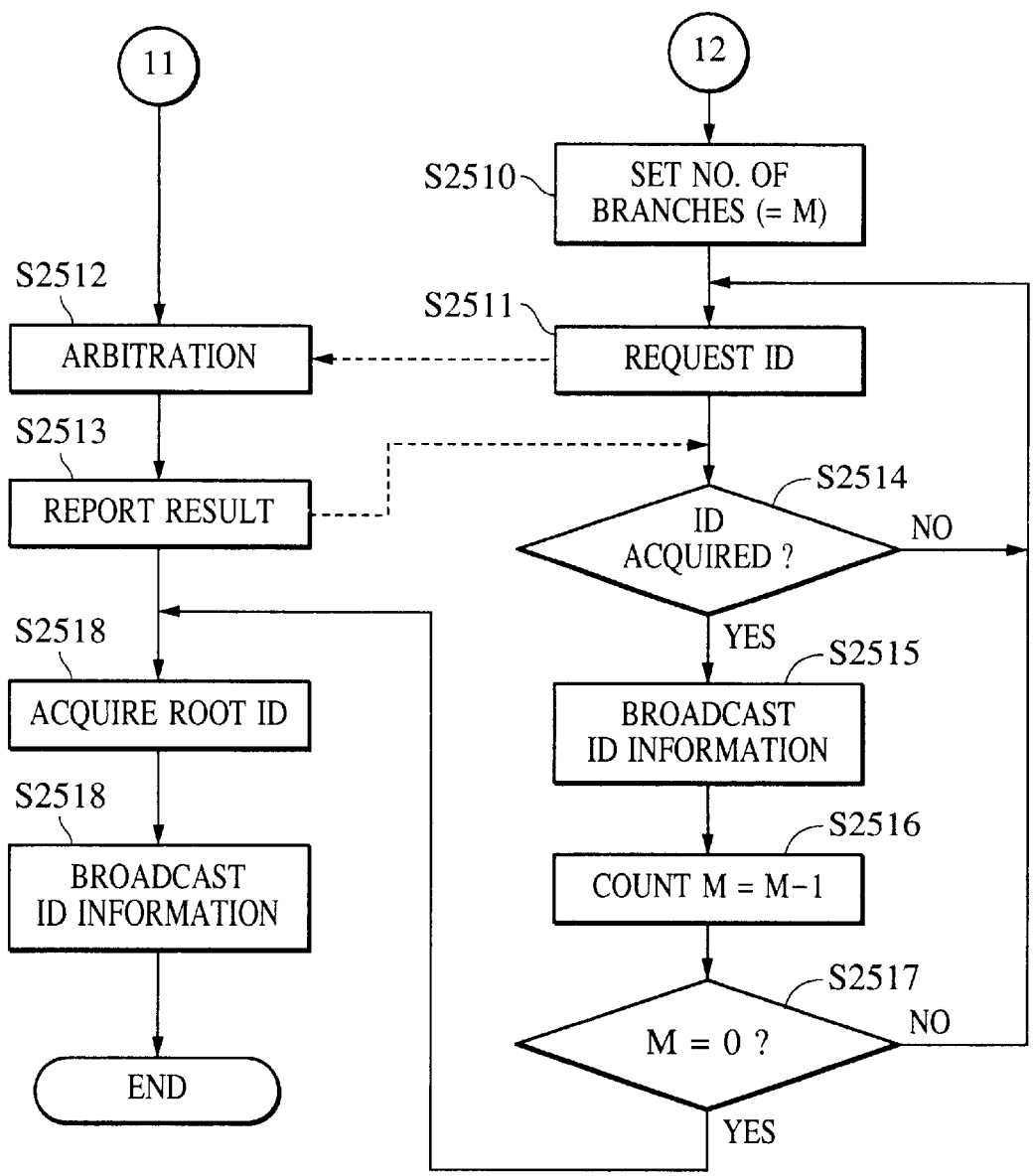
FIG. 26 is a flow chart showing more details of a procedure portion from the bus reset to determination of a root and a procedure until ID setting is completed after the root is decided.

Descriptions will now be given of the flow charts of FIG. 25 and FIG. 26. First, classification is performed in step S2501 on the basis of the flag information regarding the nodes, namely, leaves, branches, and a root, which has been set by the sequence described in FIG. 24. In the operation for assigning IDs to the nodes, leaves are qualified for ID setting first. IDs are set in an ascending order (starting with zero node number) from the leaves, branches, and root in this order. In step S2502, a number N (N is a natural number) of leaves existing in the network is set. Thereafter, each leaf requests an ID from the root in step S2503. If there are a plurality of requests, then the root carries out arbitration for reducing the requests to one request in step S2504, and assigns an ID number to one node that has won while it notifies defeated nodes of rejections in step S2505.

In step S2506, a leaf that has failed to acquire an ID requests an ID again and repeats the same operation. The leaf that has acquired an ID proceeds to step S2507 wherein ID information regarding the node is transferred to all nodes by broadcast (communication from one node to any number of nodes on the network). Upon completion of the broadcast of the ID information regarding that one node, the number of the remaining leaves is reduced by one in step S2508. If it is found in step S2509 that the number of the remaining leaves is 1 or more, then the procedure from requesting an ID of step S2503 is repeated. Finally, when all leaves have broadcast ID information, N=0 is obtained in step S2509, meaning that setting of IDs for the branches can be started.

The setting of IDs for the branches is performed in the same manner as that for the leaves. First, in step S2510, a number M (M is a natural number) of branches existing in the network is set. Thereafter, each branch requests an ID from the root in step S2511. The root carries out arbitration in step S2512 to assign ID numbers in an ascending order, following the last number assigned to the last leaf, to winning branches. In step S2513, the root provides the branches, which have issued the requests, with ID information or notification of rejections. In step S2514, a branch that has failed to acquire an ID requests for an ID again and repeats the same operation.

The branch that has acquired an ID proceeds to step S2515 wherein ID information regarding the node is transferred to all nodes by broadcast. Upon completion of the broadcast of the ID information regarding that one node, the number of the remaining branches is reduced by one in step S2516. If it is found in step S2517 that the number of the remaining branches is 1 or more, then the procedure from requesting an ID of step S2511 is repeated. Finally, when all branches have broadcast ID information, M=0 is obtained in step S2517, thus completing a branch ID acquiring mode.

At this point, the node that has not yet acquired ID information is only the root. The smallest available number is set as the ID number of the root in step S2518, and the ID information of the root is broadcast in step S2519. This completes the procedure from a point following the step wherein the set memberships are established to the completion of the setting of IDs for all nodes as shown in FIG. 25 and FIG. 26.

Figure 27:
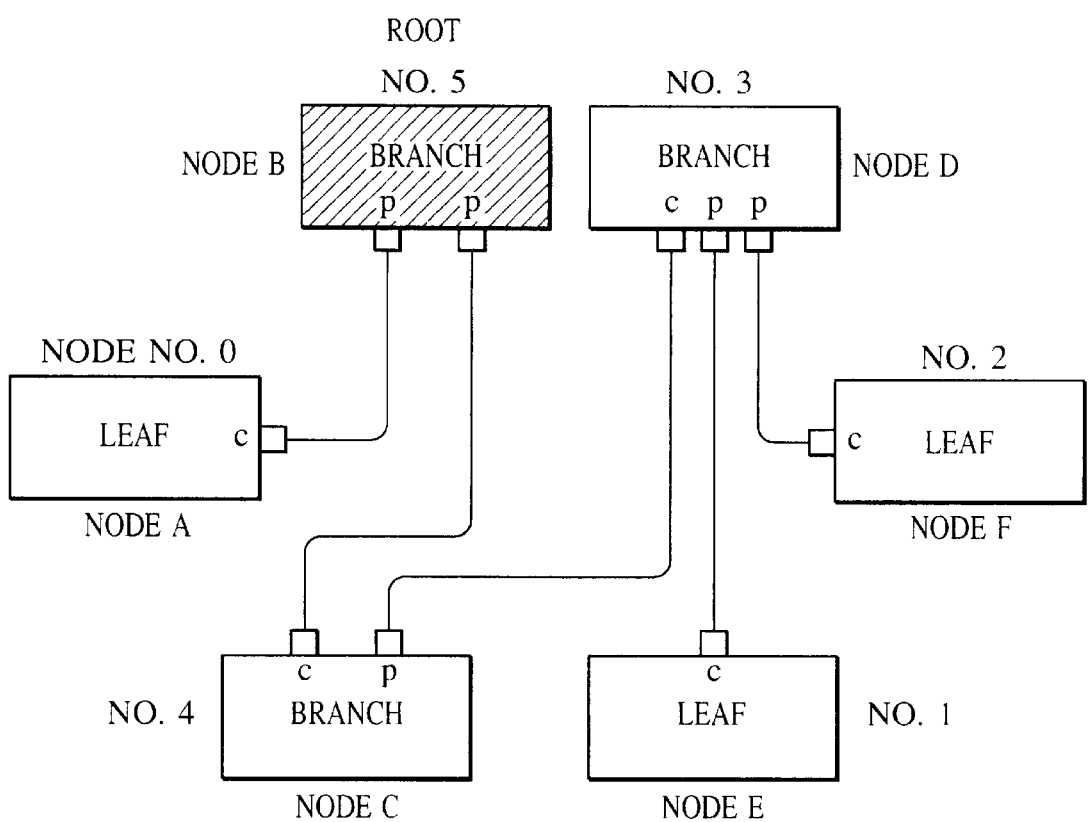
FIG. 27 is a block diagram for explaining an operation in an actual network.

An example of an operation in an actual network shown in FIG. 27 will now be described. FIG. 27 shows a hierarchical structure wherein lower node A and node C are directly connected to a root node B, a further lower node D is directly connected to node C, and further lower node E and node F are directly connected to node D. The hierarchical structure and a procedure for deciding the root node and node IDs will be described.

Following a bus reset, set memberships are first declared between directly connected ports of each node in order to recognize the connection state of each node. In the set membership, it may be considered that a parent is of a high order, while a child is of a low order in the hierarchical structure. In FIG. 27, following the bus reset, node A declares the set membership first. Basically, a node (referred to as a "leaf") that has connection to only one port thereof is qualified to declare the set membership first. This is because the node can first find that it has connection to only one port, so that it recognizes that it is located at an end of the network. Set memberships are established sooner with nodes that act more quickly. Thus, a port of a node that declares the set membership (node A of nodes A and B) is set as a child, while a port of the other node, namely, node B, is set as a parent. In this manner, the set memberships are decided as follows: child-parent for nodes A-B; child-parent for nodes E-D; and child-parent for nodes F-D.

The nodes having a plurality of connected ports are one order higher, and are referred to as "branches". These nodes will declare set memberships toward higher orders in succession as soon as they accept declarations of set memberships from other nodes. Referring back to FIG. 27, after the set memberships are established between nodes D and E and between nodes D and F, node D first declares a set membership to node C. As a result, the relationship of child and parent is established between nodes D and C. Node C that has received the declaration of the set membership from node D declares a set membership to node B connected to the other port thereof. This establishes the relationship of child and parent between nodes C and B. Thus, the hierarchical structure as shown in FIG. 27 is constructed, and node B that has become the parent in the end among all the connected ports has been decided as a root node. There is only one root in a network.

In FIG. 27, node B has been established as the root node; however, the root node could have been a different node if node B, which has received the declaration of the set membership from node A, had declared the set membership to another node earlier. In other words, any node can be the root node, depending on a transmission timing, and the root node may change even if the network configuration remains unchanged.

After the root node has been decided, the mode for deciding node IDs is begun. In this mode, every node notifies its node ID to all other nodes as soon as its node ID is decided. This is known as a broadcast feature. The ID information of each node mainly includes a node number, information regarding a connected position, the number of its own ports, the number of ports connected to others, and information regarding a set membership of each port. A procedure for assigning node ID numbers is as follows: node numbers 0, 1, 2, and so on are assigned to nodes or leaves, starting with a node that has only one port in connection. The nodes that have acquired node IDs transmit information including the node ID numbers to all other nodes by broadcast. Thus, it is recognized that the broadcast ID numbers have been assigned.

When all leaves have acquired their node IDs, setting of IDs for the branches is begun. The node ID numbers following the last ID number assigned to the last leaf are assigned to the branches. As in the case of the leaves, as soon as the branches acquire node ID numbers, they broadcast the node ID information in sequence, and lastly, the root node broadcasts its own ID information. This means that the root always has the largest node ID number. Thus, the assigning of node IDs of the entire hierarchical structure is completed, and the network is reconfigured, completing the initialization of the bus.

In the 1394 serial bus, arbitration for the right of using the bus is always carried out prior to data transfer. The 1394 serial bus provides a logical bus network that enables each device individually connected to relay transferred signals so as to transmit the same signals to all devices in the network. Hence, arbitration is necessary to prevent collisions of packets because the arbitration enables transfer via only one node during a certain period of time. The arbitration will be explained in conjunction with FIG. 28A which shows requests for the right of using the bus, and FIG. 28B which shows the acceptance and rejections of the requests for the right of using the bus.

Figure 28A:
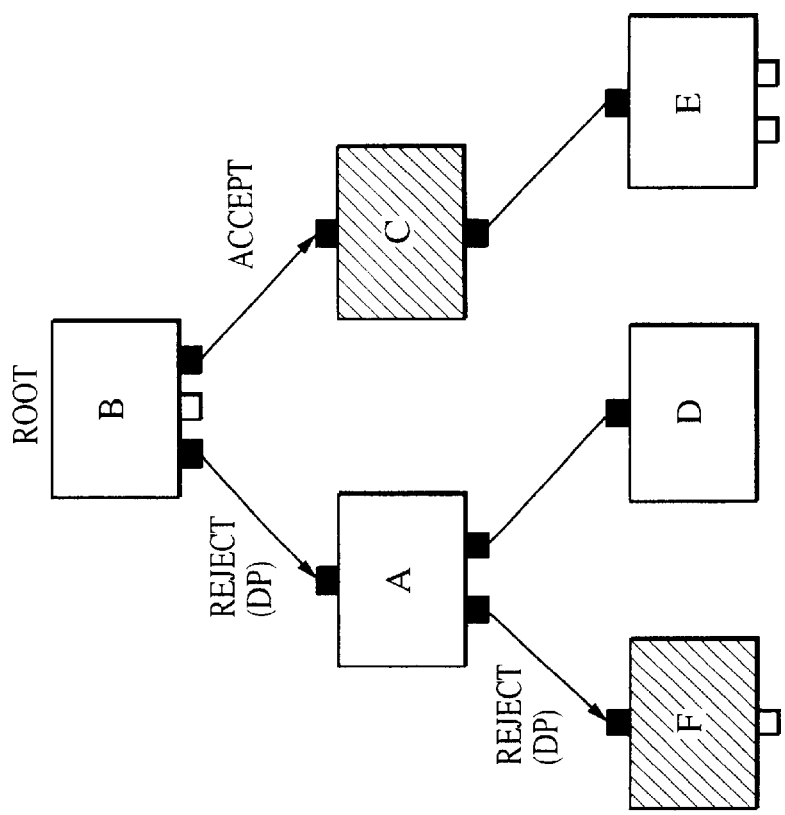
FIG. 28A is a block diagram showing a request for using a bus.

As soon as the arbitration is begun, one or plural nodes issue requests for the right of using the bus to parent nodes. Node C and node F in FIG. 28A are the nodes issuing the requests for the right of using the bus. A parent node (node A in FIG. 28) that has received the requests also issues or relays requests for the right of using the bus to another parent node. The requests are eventually delivered to the root that performs the arbitration.

Figure 28B:
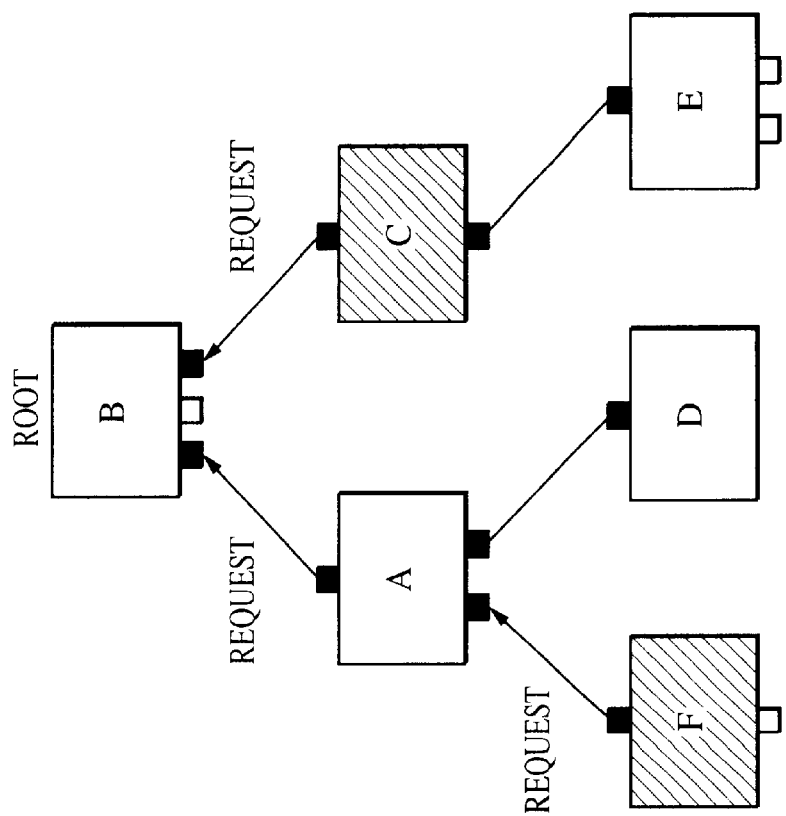
FIG. 28B is a block diagram showing rejected and accepted requests for using the bus.

The root node that has received the requests for the right of using the bus decides which node should be granted the right of using the bus. The arbitration may be performed only by the root node, and the right of using the bus is granted to a node that has won the arbitration. FIG. 28B shows that the right of use has been granted to node C, while the request from the node F has been rejected. The root node sends a data prefix (DP) packet to the node that has lost in the arbitration to notify the node of the rejection. The node having its request rejected has to wait for the next arbitration for the right of using the bus.

The node that has acquired the right of using the bus by winning the arbitration as described above can start data transfer. The series of steps of the arbitration will be described with reference to the flow chart of FIG. 29. The bus must be in an idle mode for a node to begin data transfer. Each node finds out that preceding data transfer has been completed and the bus is currently available by going through predetermined idle time gaps (e.g. a subaction gap), which are individually set for respective transfer modes. This enables each node to decide that it can start its transfer.

In step S2901, it is determined whether predetermined gap lengths for async data, iso data, or other types of data to be transferred have been obtained. Unless the predetermined gap lengths are obtained, no request for the right of using the bus required for starting transfer is allowed. Therefore, each node waits until the predetermined gap lengths are obtained. If the predetermined gap lengths are obtained in step S2901, then it is determined in step S2902 whether data to be transferred is present. If it is determined that there is data to be transferred, then a request for the right of using the bus to secure the bus for transfer is issued to the root in step S2903. The signal indicating the request for the right of using the bus at this time is delivered eventually to the root by being relayed by the devices in the network as shown in FIG. 28. If it is determined in step S2902 that no data to be transferred exists, then the node waits.

Then, if the root receives, in step S2904, more than one request for using the bus issued in step S2903, then the root checks the number of nodes that have issued the request for use in step S2905. If a selection value in step S2905 indicates "No. of nodes=1," which means that one node has issued the request for the right of use, then the node will be granted the immediately following right of use of the bus. If the selection value in step S2905 indicates "No. of nodes>1," which means a plurality of nodes have issued the requests for use, then the root performs arbitration in step S2906 to select only one node to which the right of use is granted. The arbitration is impartial; it is designed to equally grant the right to avoid authorizing the same node repeatedly.

In step S2907, the plural nodes that have issued the requests for use are sorted to the one that has obtained the right of use in the arbitration by the root in step S2906 and to the rest that has lost the arbitration. The root sends a permit signal in step S2908 to the one node that has obtained the right of use from the arbitration or to a node that has obtained the right of use without arbitration because the selection value in step S2905 indicates that the number of nodes requesting the use is one. The node that has acquired the permit signal starts transfer of data or packet to be transferred immediately following the receipt of the permit signal. The node that has lost the arbitration and therefore failed to obtain the right for using the bus in step S2907 receives the foregoing DP packet, which indicates that it has lost the arbitration, from the root in step S2909. Upon receipt of the DP packet, the node returns to step S2901 to issue another request for using the bus for re-transfer, and waits until the predetermined gap lengths are obtained.

Figure 29:
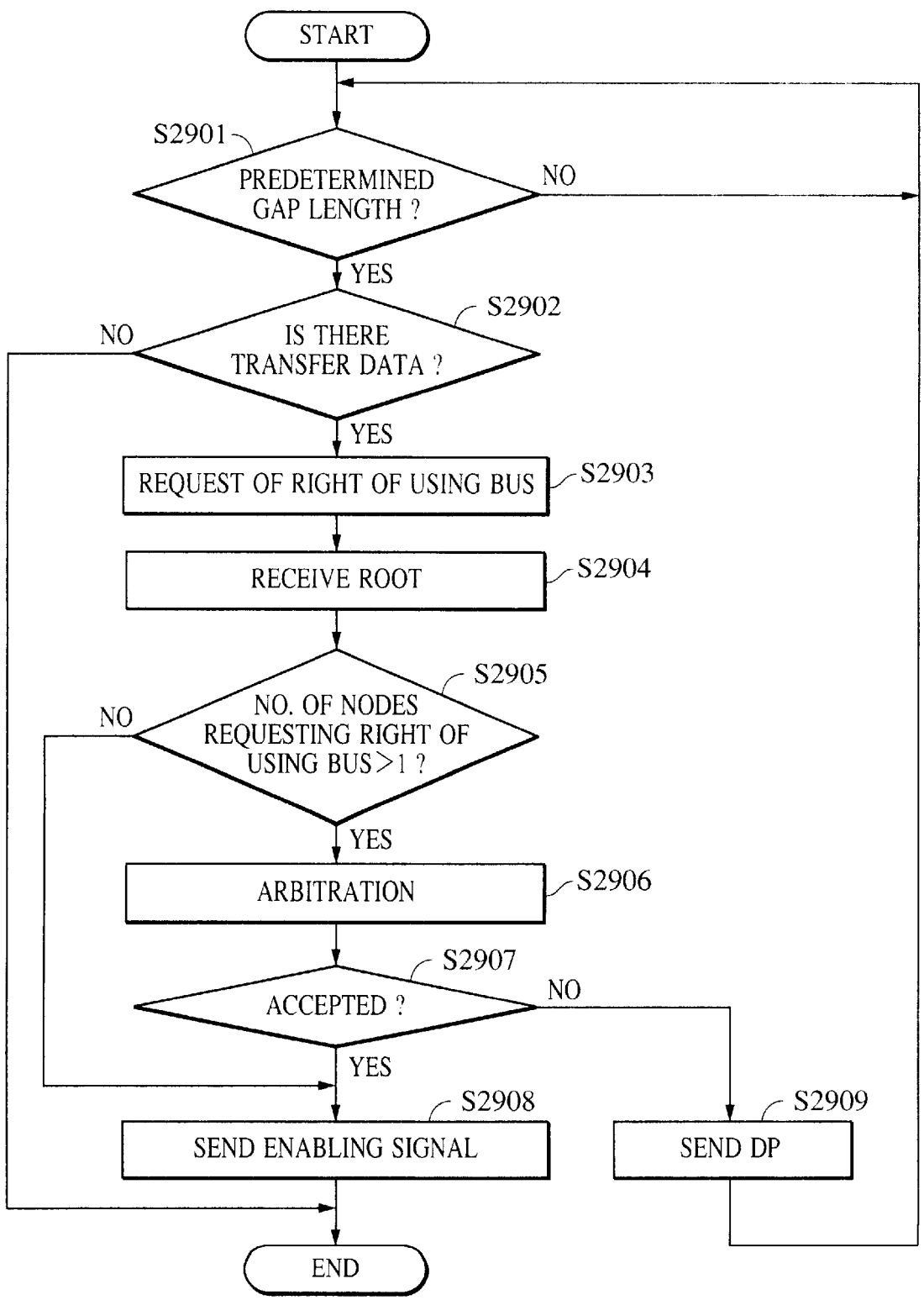
FIG. 29 is a flow chart showing a series of steps of arbitration.

This completes the description of the flow of the arbitration with reference to the flow chart of FIG. 29.

Figure 30:
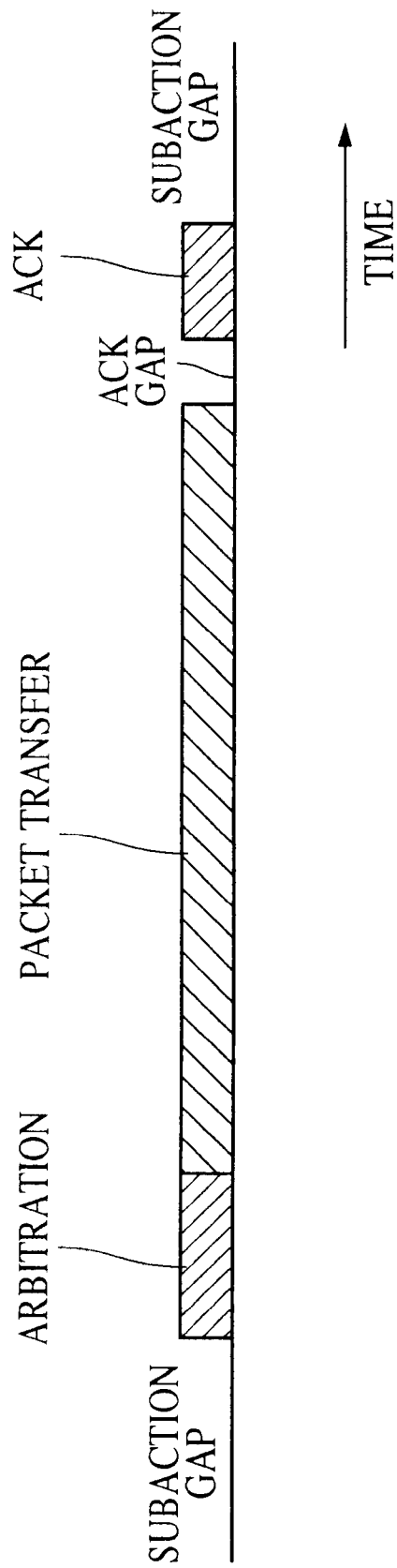
FIG. 30 is a schematic representation showing a time-dependent transitional state in an asynchronous transfer.

Time-dependent transitional state in asynchronous transfer is shown in FIG. 30. A subaction gap of FIG. 30 indicates an idle mode of the bus. When the idle time reaches a fixed value, a node wishing to perform transfer determines that the bus is available and implements arbitration to acquire the bus. If the node is authorized to use the bus as a result of the arbitration, then data transfer is carried out in the form of packets. After the data transfer, a node that has received the data responds by sending back ack, which is a return code for confirming receipt and which serves as a receiving result of the transferred data, after a short gap known as an ack gap, or sends a response packet, thereby completing the transfer. The code ack is formed of 4-bit information and 4-bit checksum to include information indicating success, busy, pending, or other states, and ack is immediately returned to the sender node.

Figure 31:
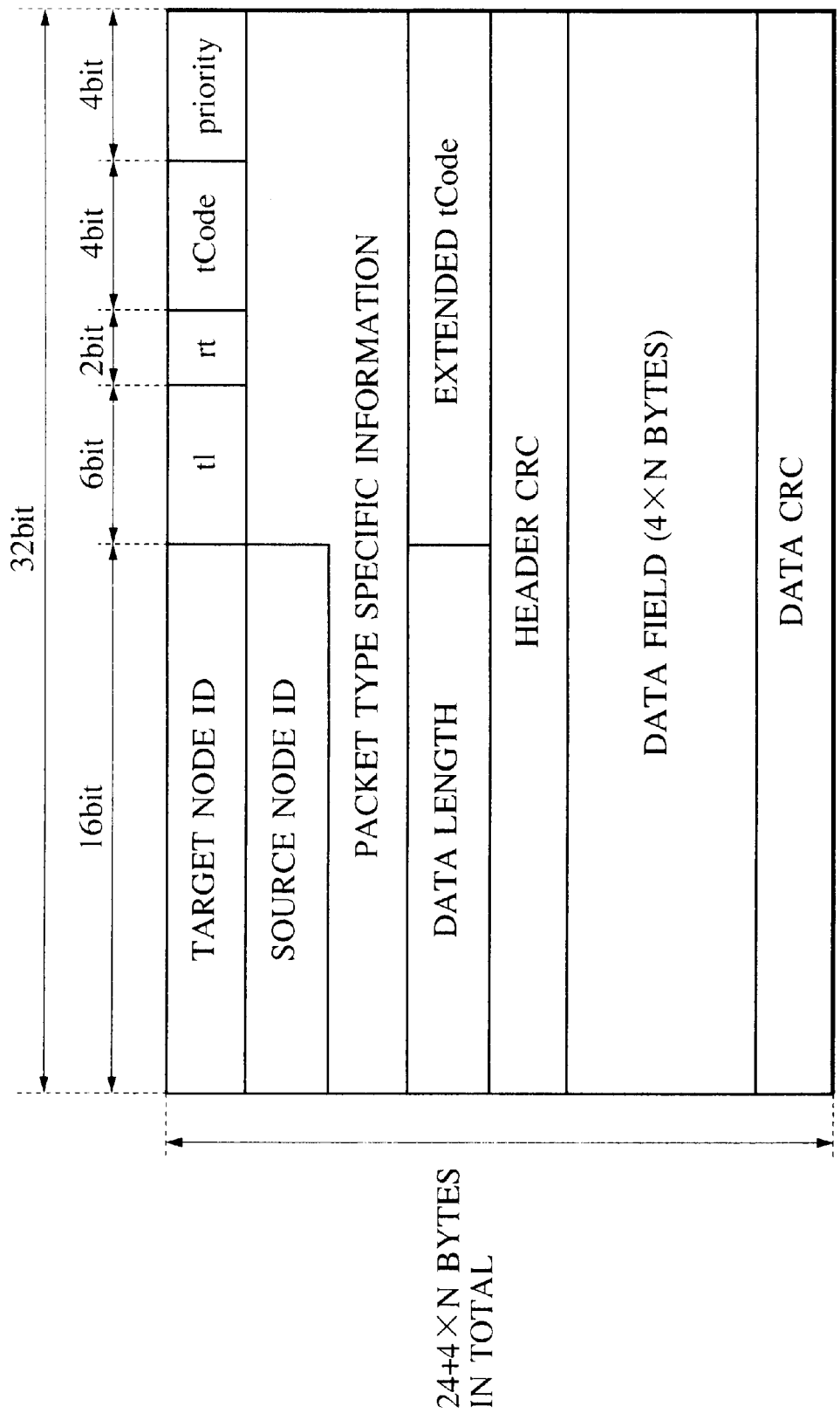
FIG. 31 is a schematic representation showing an example of a packet format for the asynchronous transfer.

FIG. 31 shows an example of a packet format of asynchronous transfer. The packet includes a header in addition to data and a data cyclic redundancy check (CRC) for correcting an error. In the header, a target node ID, a source node ID, a transfer data length, various codes, etc., are written as shown in FIG. 31 and transferred. The asynchronous transfer is one-to-one communication from one node to another node. A packet transferred from an originating node is transferred to every node of the network. However, nodes ignore packets except those addressed to them, so that only one node will read the packet addressed thereto.

This completes the description of the asynchronous transfer.

The isochronous transfer, which can be considered as the most important feature of the 1394 serial bus, is a transfer mode suited for transferring data that requires real-time transfer especially for multi-media data such as video data and audio data. While the asynchronous transfer is one-to-one transfer, the isochronous transfer is characterized by a broadcast feature that enables one originating node to transfer data to all other nodes at the same time.

Figure 32:
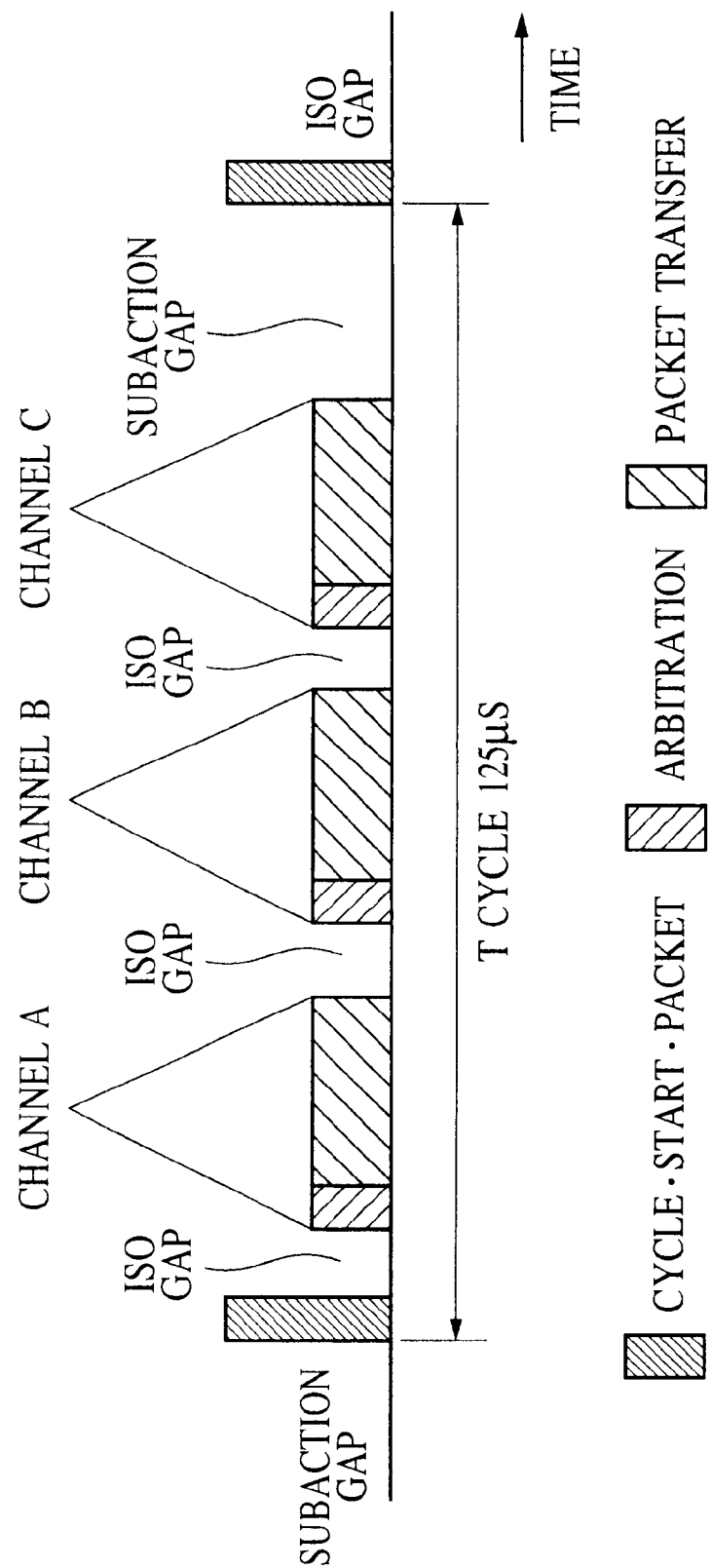
FIG. 32 is a schematic representation showing a time-dependent transitional state in an isochronous transfer.

FIG. 32 shows a time-dependent transitional states in the isochronous transfer. The isochronous transfer is executed at regular intervals on a bus. The regular intervals are referred to as "isochronous cycles," the isochronous cycle time being 125 $\mu$s. A cycle start packet is responsible for indicating the start time of each isochronous cycle and for adjusting time for each node. The cycle start packet is transmitted by a node called a "cycle master". After completion of transfer in a preceding cycle, a predetermined idle period, namely, a subaction gap, follows, then the cycle start packet indicating the start of the present cycle is transmitted. The time interval of the transmission of the cycle start packet is 125 $\mu$s.

As shown by channel A, channel B, and channel C in FIG. 32, a plurality of types of packets are individually assigned channel IDs in one cycle so as to allow the packets to be discriminated when transferring them. This arrangement enables simultaneous transfer among a plurality of nodes in a real-time mode. Receiving nodes capture only data of the channel IDs that they need. The channel IDs are merely logical numbers assigned to data and do not indicate addresses of senders. Hence, a packet is transferred by broadcast, in which the packet is sent from one sender node to all other nodes.

As in the case of the asynchronous transfer, the arbitration is carried out before transmitting packets in the isochronous transfer mode. The isochronous transfer, however, does not involve ack, which is the return code for confirming receipt, since it is not one-to-one communication like the asynchronous transfer. Iso gap, which stands for isochronous gap, shown in FIG. 32, represents an idle period of time necessary for recognizing the availability of the bus prior to isochronous transfer. When the predetermined idle period of time passes, the node wishing to perform isochronous transfer decides that the bus is available and the arbitration prior to the transfer can be implemented.

Figure 33:
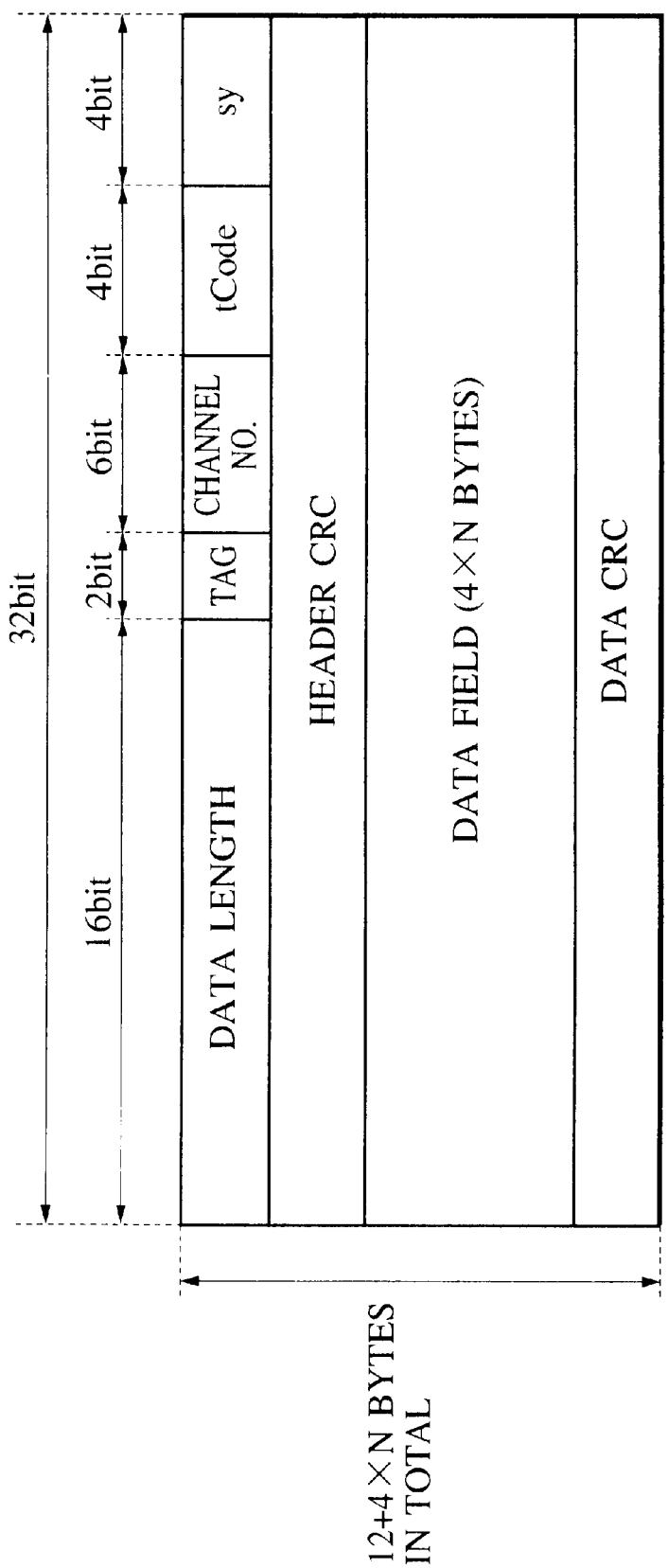
FIG. 33 is a schematic representation showing an example of a packet format for the isochronous transfer.

Referring now to FIG. 33, an example of the packet format for isochronous transfer will be described. Each of diverse packets sorted by channels has a header in addition to data and a data CRC for correcting errors. Before each packet is transferred, a transfer data length, a channel number, other diverse codes, and header CRC for correcting errors as shown in FIG. 33 are written to the header.

This completes the description of the isochronous transfer.

Figure 34:
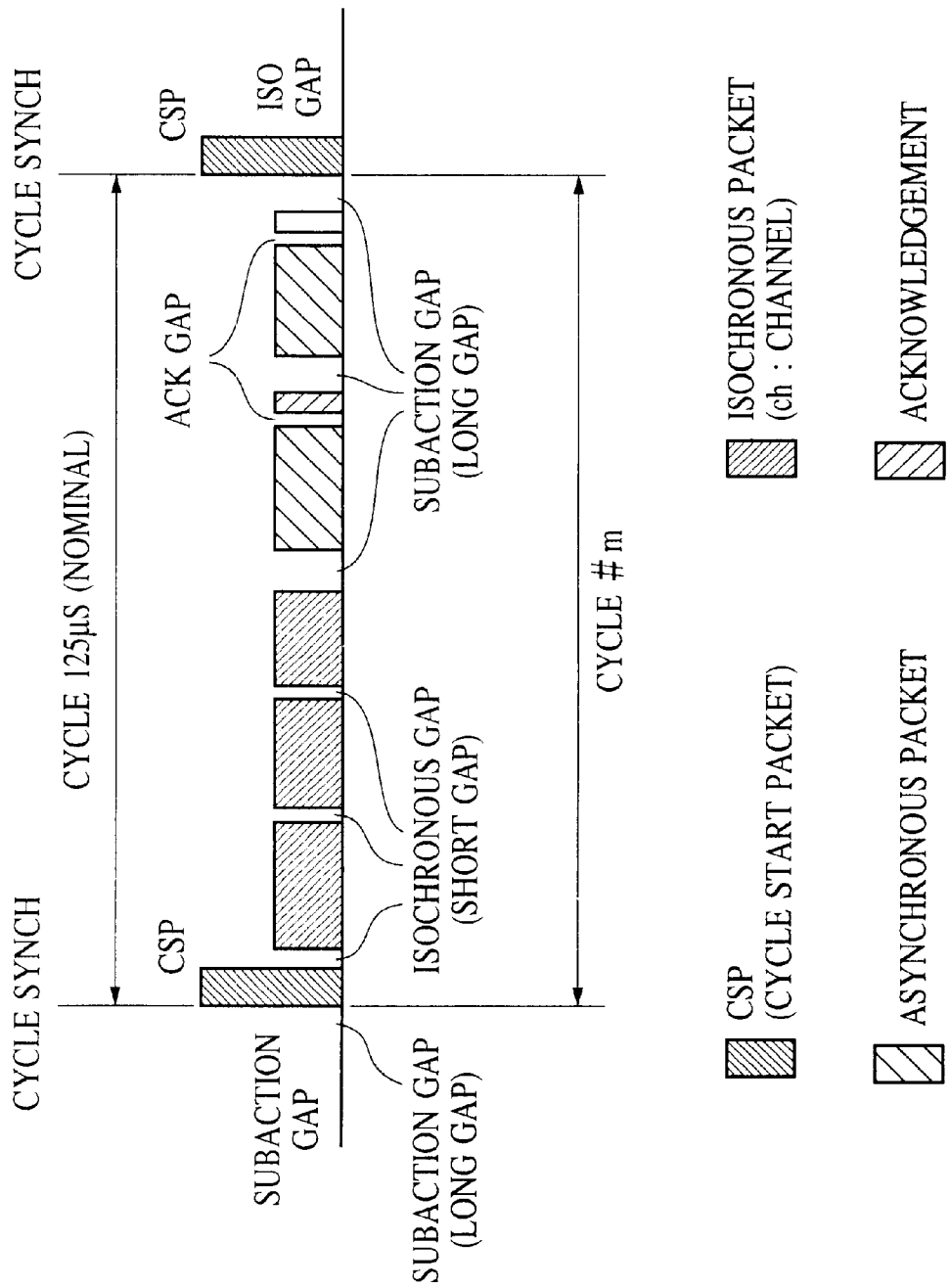
FIG. 34 is a diagram showing a time-dependent transition of a transfer state on a bus wherein the isochronous transfer and the asynchronous transfer coexist.

The isochronous transfer and the asynchronous transfer can coexist on the 1394 serial bus in actual use. FIG. 34 shows time-dependent transitional transfer states on the bus whereon the isochronous transfer and the asynchronous transfer exist together. The isochronous transfer is performed in preference to the asynchronous transfer because the isochronous transfer can be started after a shorter gap length (isochronous gap) than an idle period gap length (subaction gap) required for starting the asynchronous transfer following a cycle start packet. Thus, the isochronous transfer is performed in preference to the asynchronous transfer.

In a typical bus cycle shown in FIG. 34, a cycle start packet is transferred from a cycle master to nodes at the start of cycle #m. Then, each node performs time adjustment, and a node planning to perform isochronous transfer following the predetermined idle time, i.e. the isochronous gap, carries out arbitration before transferring a packet. In FIG. 34, channel e, channel s, and channel k are isochronously transferred in sequence.

After the series of operations from the arbitration to the packet transfer has been repeated for all given channels to thereby complete the isochronous transfer in cycle #m, the asynchronous transfer can be started. When the idle time reaches the subaction gap that enables the asynchronous transfer, a node wishing to perform asynchronous transfer determines that it can now start arbitration. The asynchronous transfer, however, can be performed only if a subaction gap for starting the asynchronous transfer occurs during a period of time from completion of isochronous transfer to the time (cycle synch) at which the next cycle start packet is to be transferred.

In cycle #m of FIG. 34, three channels are isochronously transferred and two packets, namely, packet 1 and packet 2, are transferred after that in the asynchronous transfer mode (including ack). After asynchronous packet 2 is transferred, the time (cycle synch) at which cycle #m+1 is to be started is reached, so that the transfer in cycle #m is finished at that point. If, however, the time (cycle synch) at which the next cycle start packet is to be sent is reached during asynchronous or isochronous transfer, then the transfer will not be forcibly interrupted. The cycle start packet of the next cycle will be sent after the idle period following the completion of the transfer. In other words, if one cycle lasts for 125 µs or more, it is regarded that the next cycle will be accordingly shorter than the standard duration of 125 µs.

Thus, an isochronous cycle can be prolonged or shortened from the standard duration of 125 µs. However, the isochronous transfer is always carried out, if required, in every cycle to maintain real-time transfer, whereas the asynchronous transfer may wait for the next and after cycle if a cycle time has been shortened. The cycle master performs management including information regarding such a delay. This completes the description of the IEEE 1394 serial bus.

Figure 1:
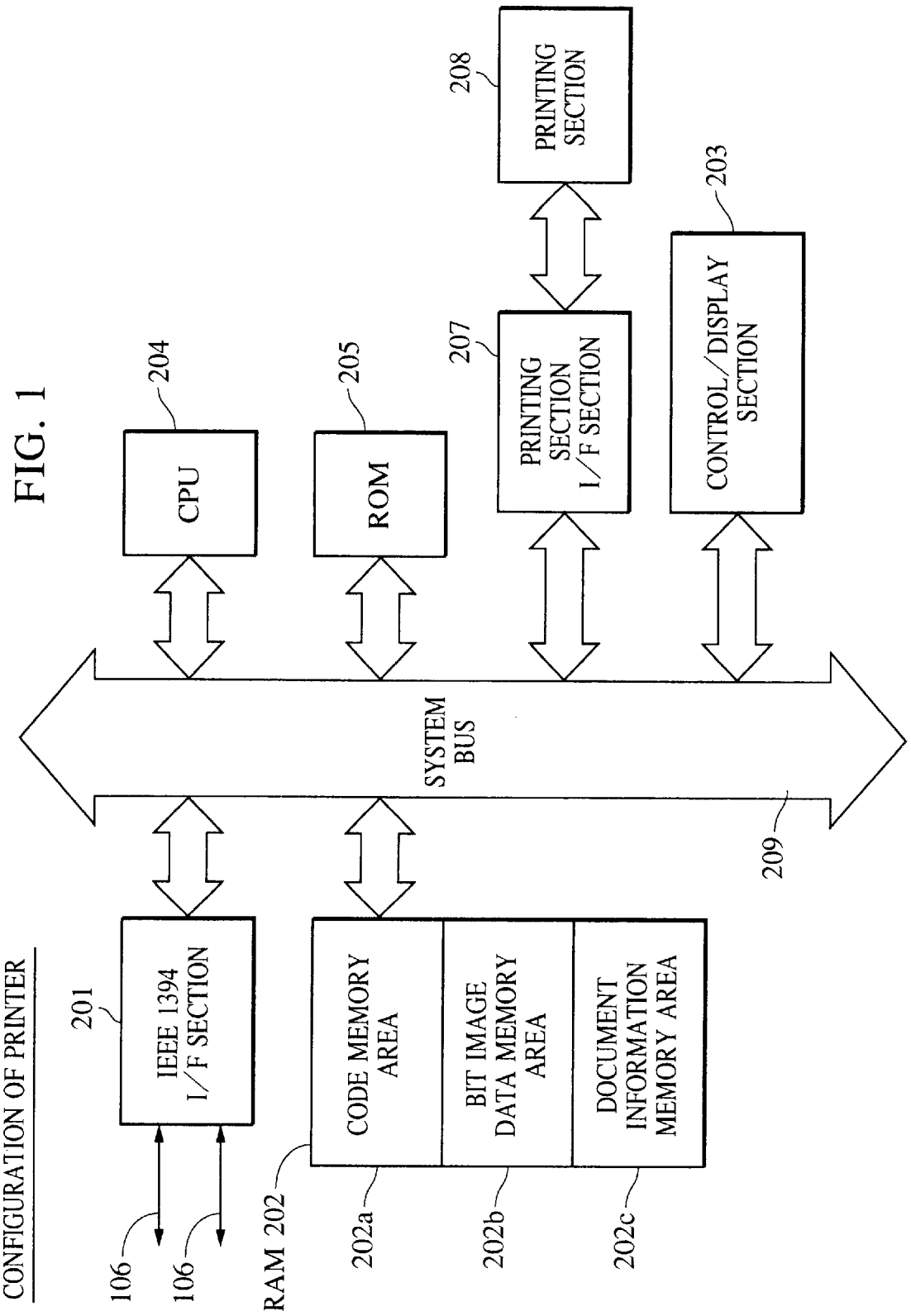
FIG. 1 is a block diagram showing a configuration of a printing apparatus of a printing system in accordance with an embodiment of the present invention.
Figure 2:
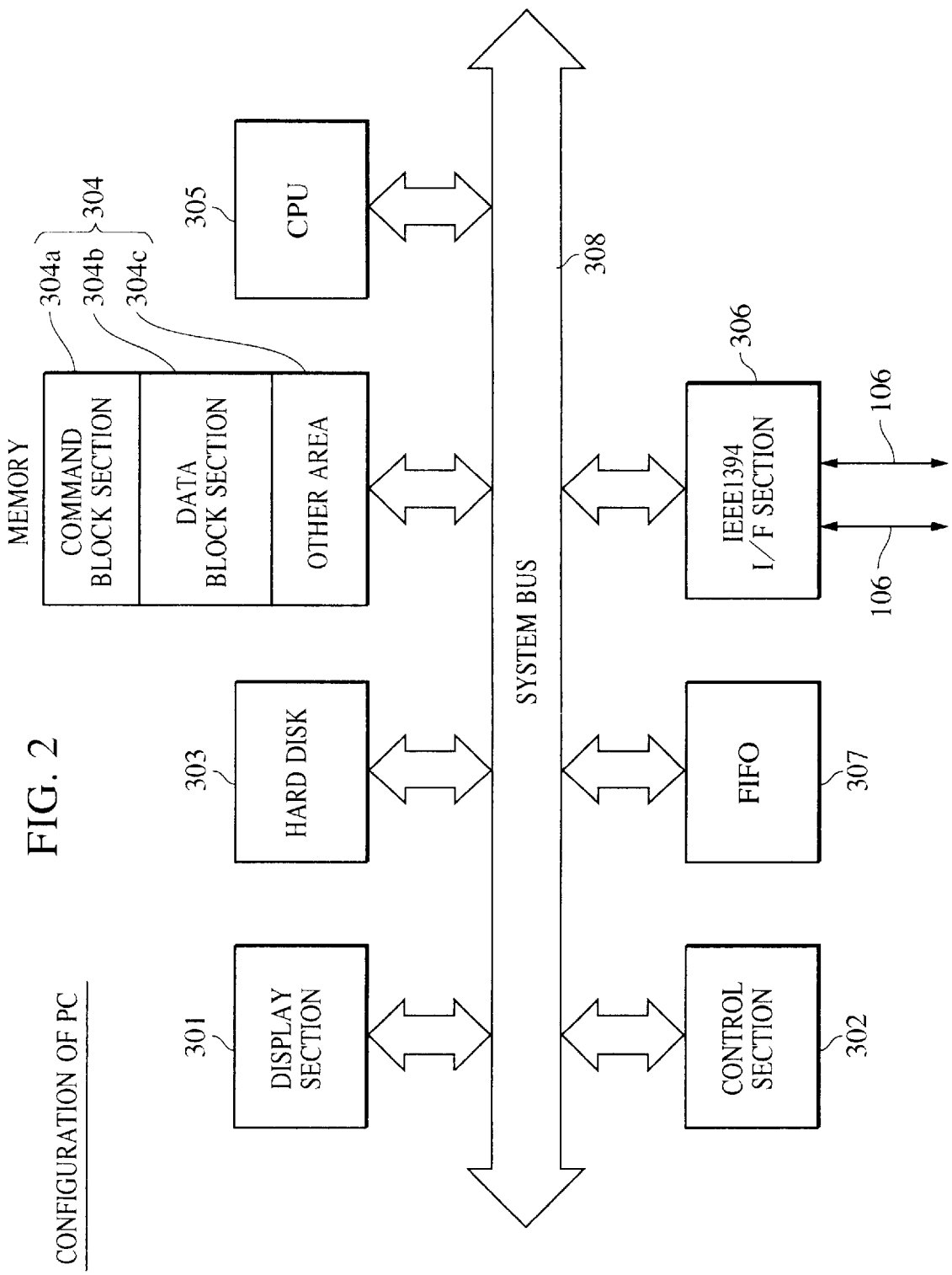
FIG. 2 is a block diagram showing a configuration of a personal computer (PC) of the printing system according to the embodiment of the present invention.

Referring now to FIG. 1 and FIG. 2, the configurations of a printer 103 and a personal computer (PC) 101 making up a printing system in accordance with the embodiment of the present invention shown in FIG. 3 will be explained in detail.

FIG. 1 is a block diagram showing the details of the configuration of the printer 103 of the printing system according to the embodiment of the invention shown in FIG. 3. The printer 103 of the printing system according to the embodiment of the invention is equipped with: an IEEE 1394 I/F section 201; a RAM 202 having a code memory area 202a, a bit image data memory area 202b, and a text information memory area 202c; a control/display section 203; a CPU 204; a ROM 205; a printing section I/F section 207; a printing section 208; and a system bus 209.

The configuration of each section listed above will be explained in detail. The IEEE 1394 I/F section 201 is mainly used to respond to an inquiry to the printer 103 from the PC 101 asking whether the printer 103 is ready for printing, receive a printing start instruction, and receive a command block. The code memory area 202a of the RAM 202 is an area for storing text data read from the PC 101 via the IEEE 1394 I/F serial bus 106. The bit image data memory area 202b of the RAM 202 is an area for storing bit images that have been converted from text data. The text information memory area 202c of the RAM 202 is an area used for other applications. The control/display section 203 is used to display a status of the printer 103 or used by an operator to enter commands.

The CPU 204 controls all sections of the printer and implements processing illustrated by the flow charts shown in FIG. 8 through FIG. 15, which will be discussed hereinafter. The ROM 205 stores operating programs or the like of the CPU 204. The printer section I/F section 207 reads bit image data expanded in the RAM 202 in synchronization with horizontal and vertical synchronization signals sent from the printing section 208, and sends the read bit image data to the printing section 208. The printing section 208 receives video data sent through the printing section I/F section 207, and performs printing on a recording medium such as paper. The system bus 209 provides a common signal path through which signals are transmitted among the foregoing sections.

In the embodiment of the present invention, a laser beam printer is taken as an example of the printer shown in FIG. 1 and FIG. 3. The present invention, however, is not limited to laser beam printers, and can be applied to a variety of printers, including an ink-jet printer, a thermal transfer printer, a thermosensitive printer, an electrostatic printer, and a discharge breakdown printer.

FIG. 2 is a block diagram showing a detailed configuration of the PC 101 of the printing system in accordance with the embodiment of the present invention shown in FIG. 3. The PC 101 of the printing system according to the embodiment of the invention is equipped with: a display section 301; a control section 302; a hard disk 303; a memory 304 having a command block section 304a, a data block section 304b, and another area 304c; a CPU 305; an IEEE 1394 I/F section 306; a first-in-first-out (FIFO) memory 307; and a system bus 308.

The foregoing sections will be explained in detail. The display section 301 is composed of a display such as a CRT for displaying characters, images, etc. The display system is not limited to a CRT and may be a liquid crystal display or the like. The control section 302 is composed of a keyboard, a mouse, or the like. The hard disk 303 stores diverse types of data. A command block, which will be discussed later, is created in the command block section 304a of the memory 304. A data block, which will be discussed later, is created in the data block section 304b of the memory 304. The other area 304c of the memory 304 is used to store other data.

Figure 16:
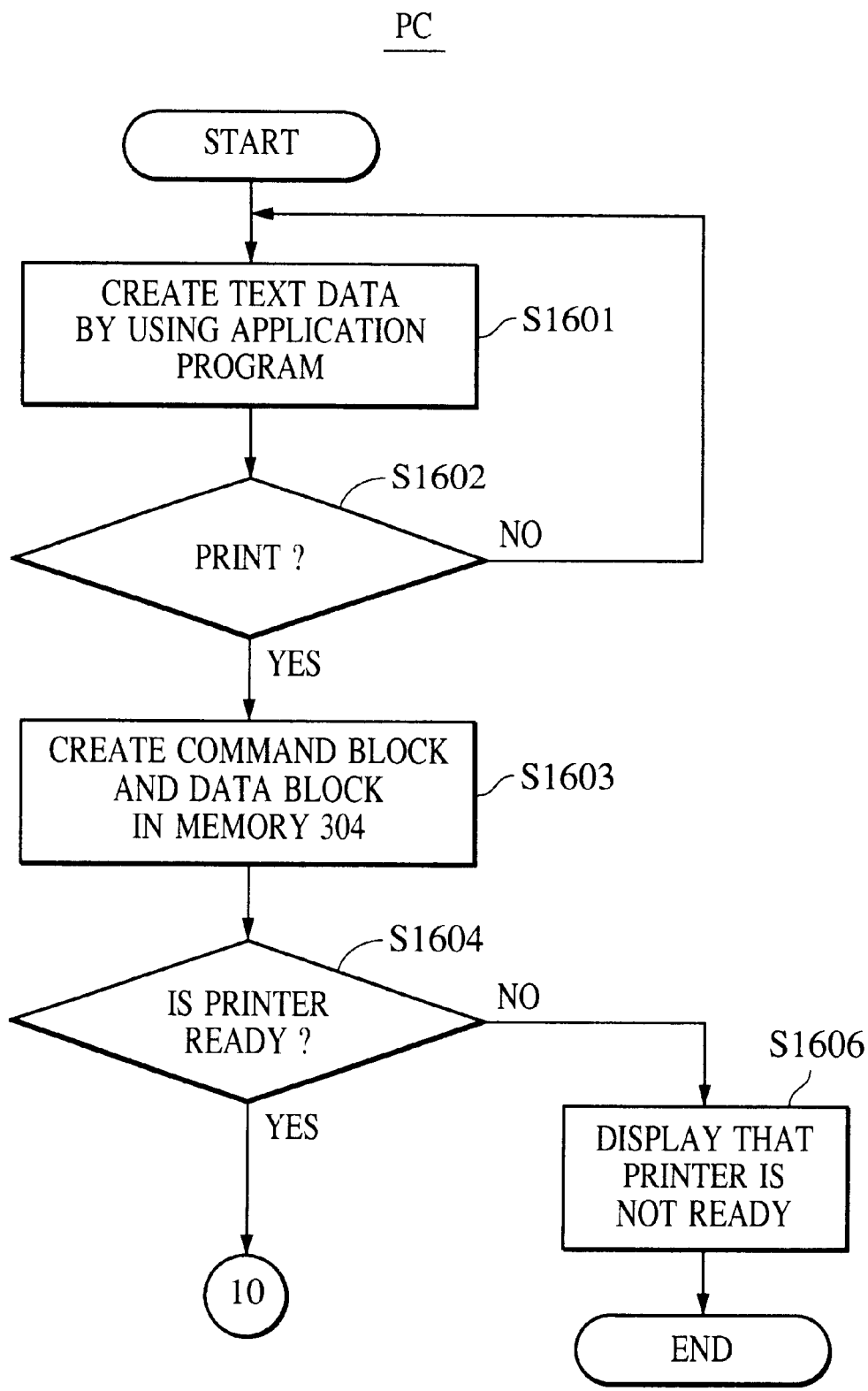
FIG. 16 is a flow chart showing a flow of an operation of a PC of the printing system according to the embodiment of the present invention.
Figure 17:
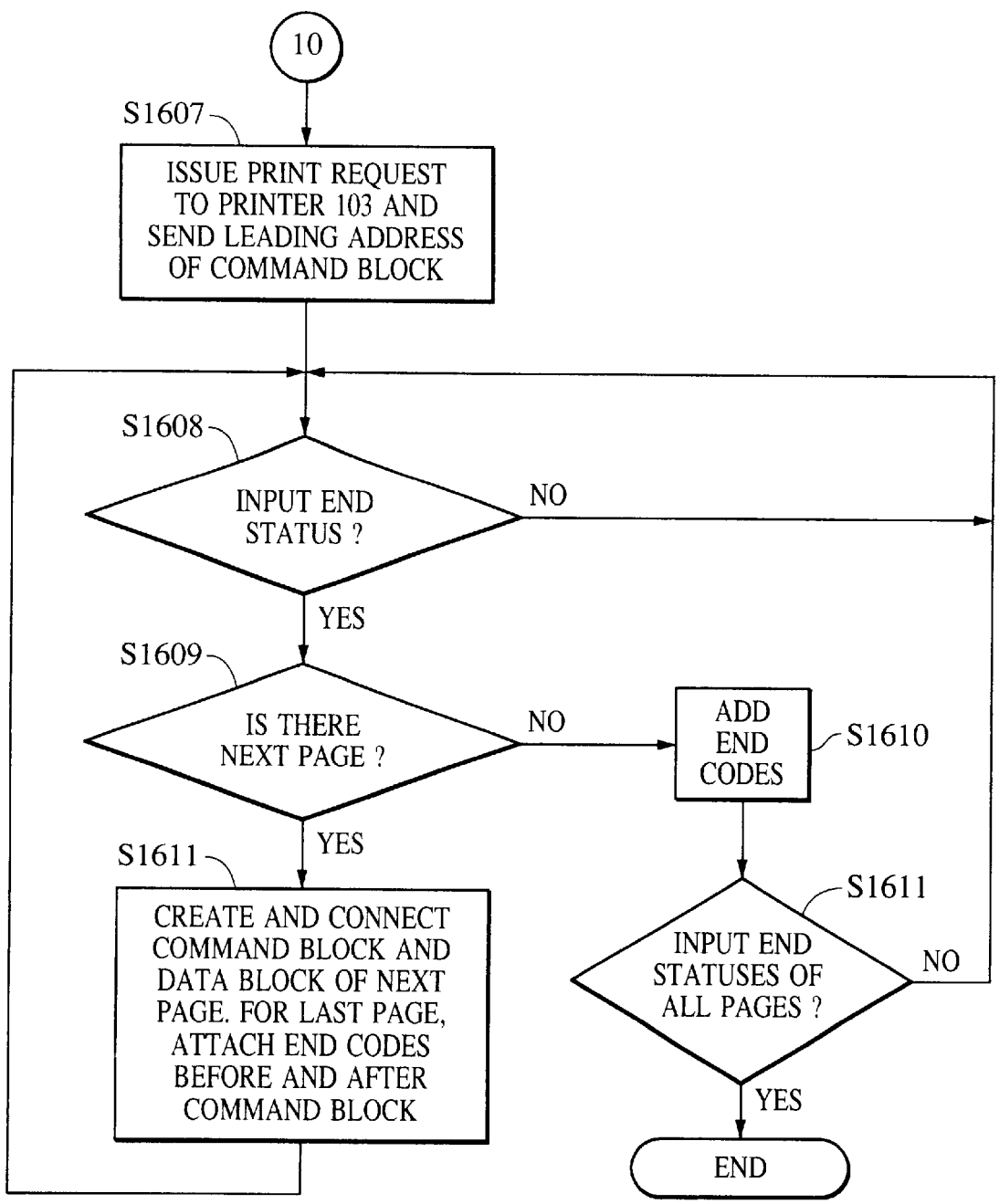
FIG. 17 is a flow chart showing a flow of the operation of the PC of the printing system according to the embodiment of the present invention.

The CPU 305 controls all sections of the PC, and carries out processing illustrated by the flow charts shown in FIG. 16 and FIG. 17, which will be discussed hereinafter. The IEEE 1394 I/F section 306 is primarily used for sending an inquiry to the printer 103 from the PC 101 asking if the printer 103 is ready for printing, sending printing start instructions, and sending command blocks. The FIFO 307 is a first-in-first-out memory used for entering statuses. The system bus 308 is a common signal path along which signals are transmitted among the aforesaid sections.

Figure 4:
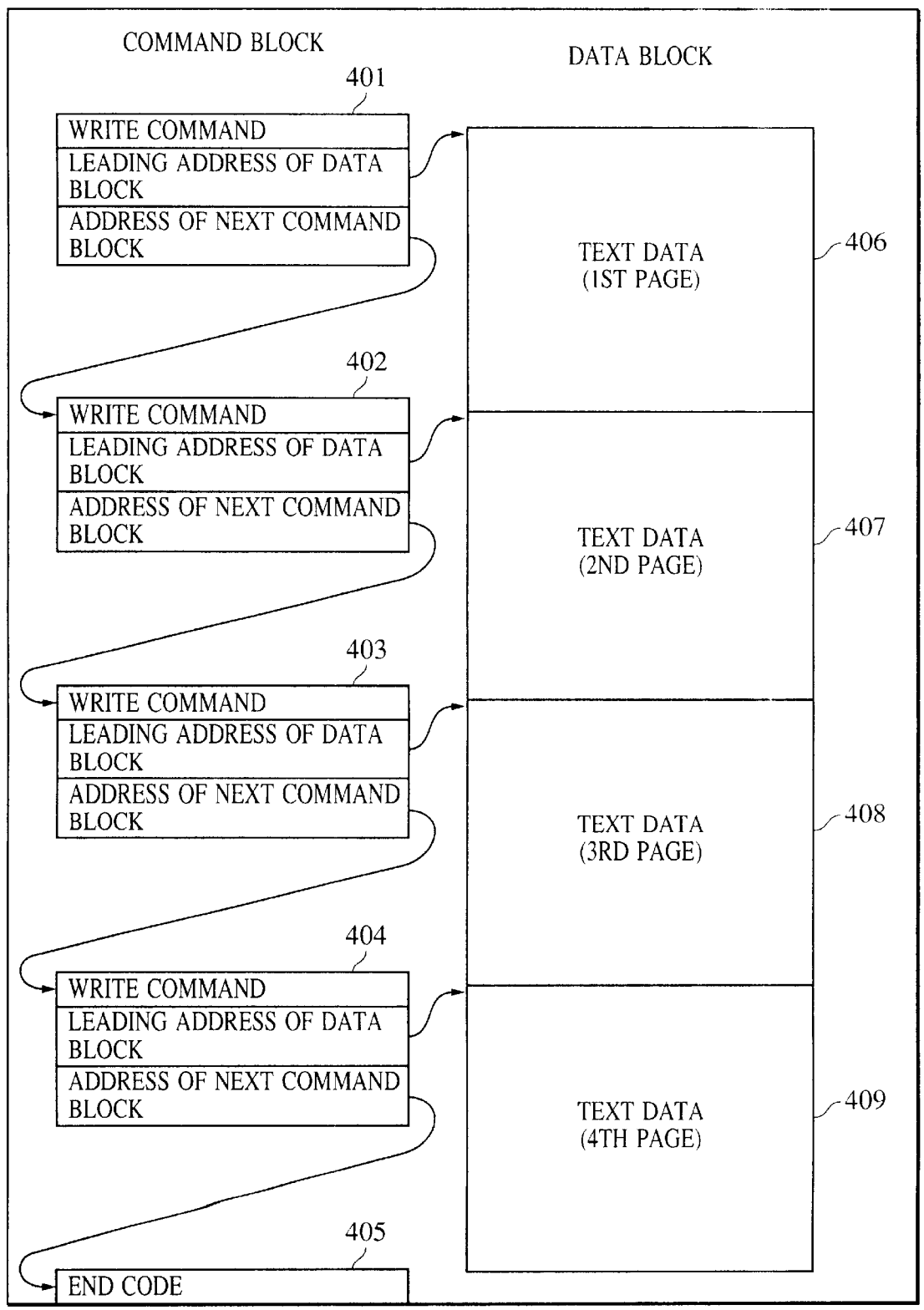
FIG. 4 is a schematic representation illustrating the configurations of a command block and a data block created in a memory of the PC of the printing system according to the embodiment of the present invention.
Figure 5:
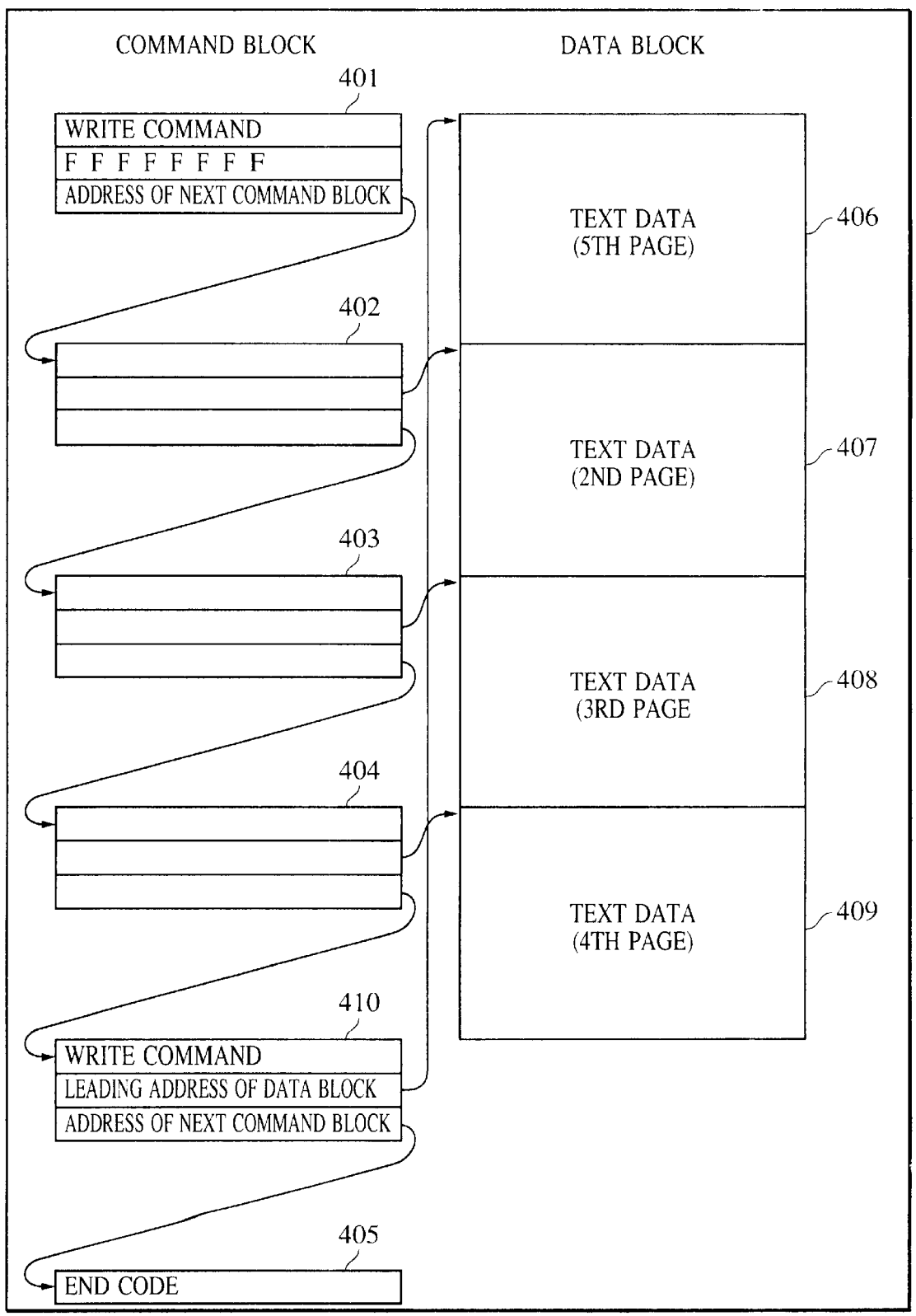
FIG. 5 is a schematic representation illustrating the configurations of a command block and a data block created in a memory of the PC of the printing system according to the embodiment of the present invention.

FIG. 4 and FIG. 5 are schematic representations showing the configurations of a command block and a data block created in the memory 304 of the PC of the printing system (the configuration of text data created in the memory 304) in accordance with the embodiment of the present invention. In this embodiment, an example wherein text data composed of four pages is sent to the printer 103 to print it will be described.

Referring to FIG. 4, reference numerals 401 through 405 denote command blocks created in the command block section 304a of the memory 304 of the PC, and reference numerals 406 through 409 denote data blocks created in the data block section 304b of the memory 304 of the PC. In this embodiment, each data block includes text data equivalent to one page of each page. A code indicating an end is attached to the end of the text data of each page.

Of the command blocks, the one denoted by reference numeral 405 is a command block that includes an end code for notifying the printer of the end of the command blocks. Each of the command blocks 401 through 404 is formed of three sections, a first section being an area indicating contents of a command issued to the printer (write command in this embodiment), a second section including a leading address information regarding a corresponding data block, and a third section including a leading address information regarding the next command block. For instance, in the case of the command block 401, the first section includes a write command, the second section includes the leading address of the data block 406, and the third section includes the leading address of the command block 402.

Figure 6:
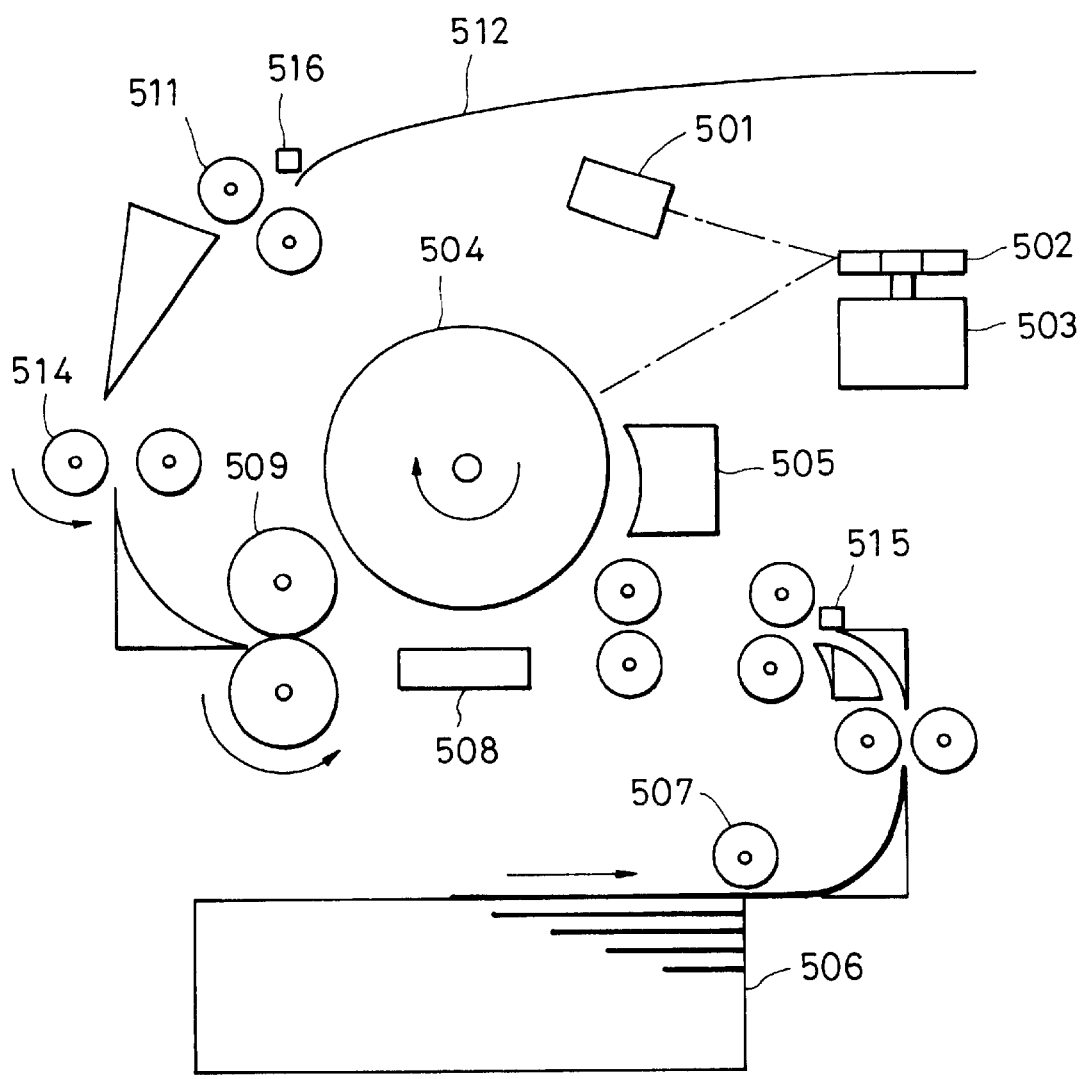
FIG. 6 is a block diagram showing a schematic structure of a printing section of the printing apparatus of the printing system according to the embodiment of the present invention.

FIG. 6 is a block diagram showing a schematic structure of the printing section of the printer of the printing system in accordance with the embodiment of the present invention. The printing section of the printer of the printing system in accordance with the embodiment of the invention is equipped with a semiconductor laser 501, a rotating mirror 502, a motor 503, a photoconductive drum 504, a transferring device 505, a paper holder 506, a pickup roller 507, a developing device 508, a fixing device 509, an ejecting roller 511, a paper ejector 512, a paper feed sensor 515, and an ejection sensor 516.

The above component units will be explained in detail. The semiconductor laser 501 is turned ON/OFF on the basis of bit images, and it emits laser beams. The rotating mirror 502 is driven by the motor 503 and irradiates an output of the semiconductor laser 501, which has been ON/OFF-modulated by bit image data, toward the photoconductive drum 504. The motor 503 drives the rotating mirror 502. A latent image is formed on a drum surface of the photoconductive drum 504 by a laser beam. The transferring device 505 transfers the latent image formed on the photoconductive drum 504 onto printing paper. The paper holder 506 holds paper. The pickup roller 507 picks up paper in the paper holder 506 at an appropriate timing, the paper being fed to the photoconductive drum 504 in succession by the roller.

The developing device 508 develops the paper. The fixing device 509 fixes a toner on the paper. The ejecting roller 511 sends the fixed paper to the paper ejector 512. The paper ejector 512 ejects paper. The paper feed sensor 515 outputs a detection signal to the CPU 204 when it detects paper passing in front of the paper feed sensor 515. In this case, the CPU 204 performs synchronization of the advancing direction of paper on the basis of the detection signal to adjust the timing so that printing can be accomplished at a desired paper position. The ejection sensor 516 outputs a detection signal to the CPU 204 when it detects paper passing in front of the ejection sensor 516.

Figure 7A:
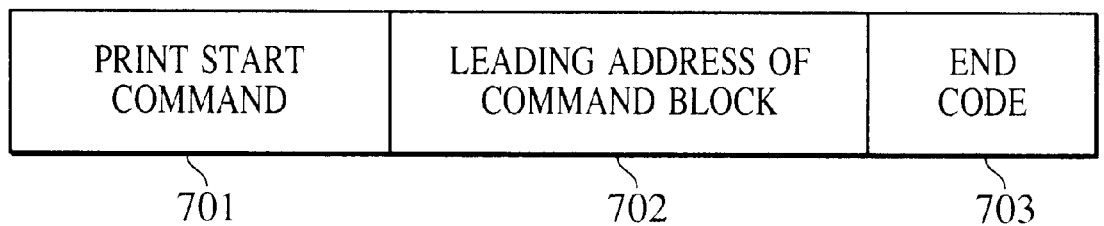
FIG. 7A is a schematic representation showing a print start command issued from the PC to the printing apparatus.
Figure 7B:
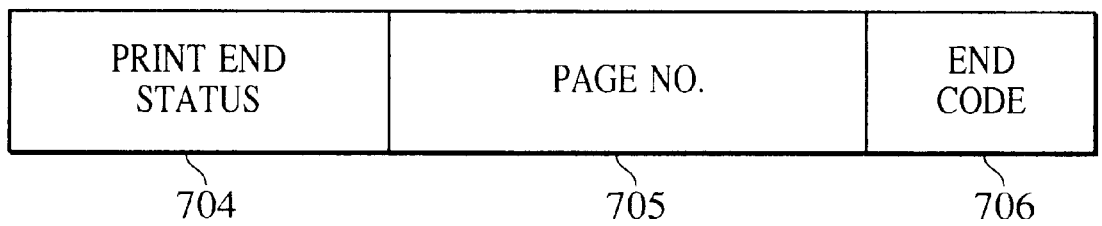
FIG. 7B is a schematic representation showing a print end status sent from the printing apparatus to the PC.
Figure 8:
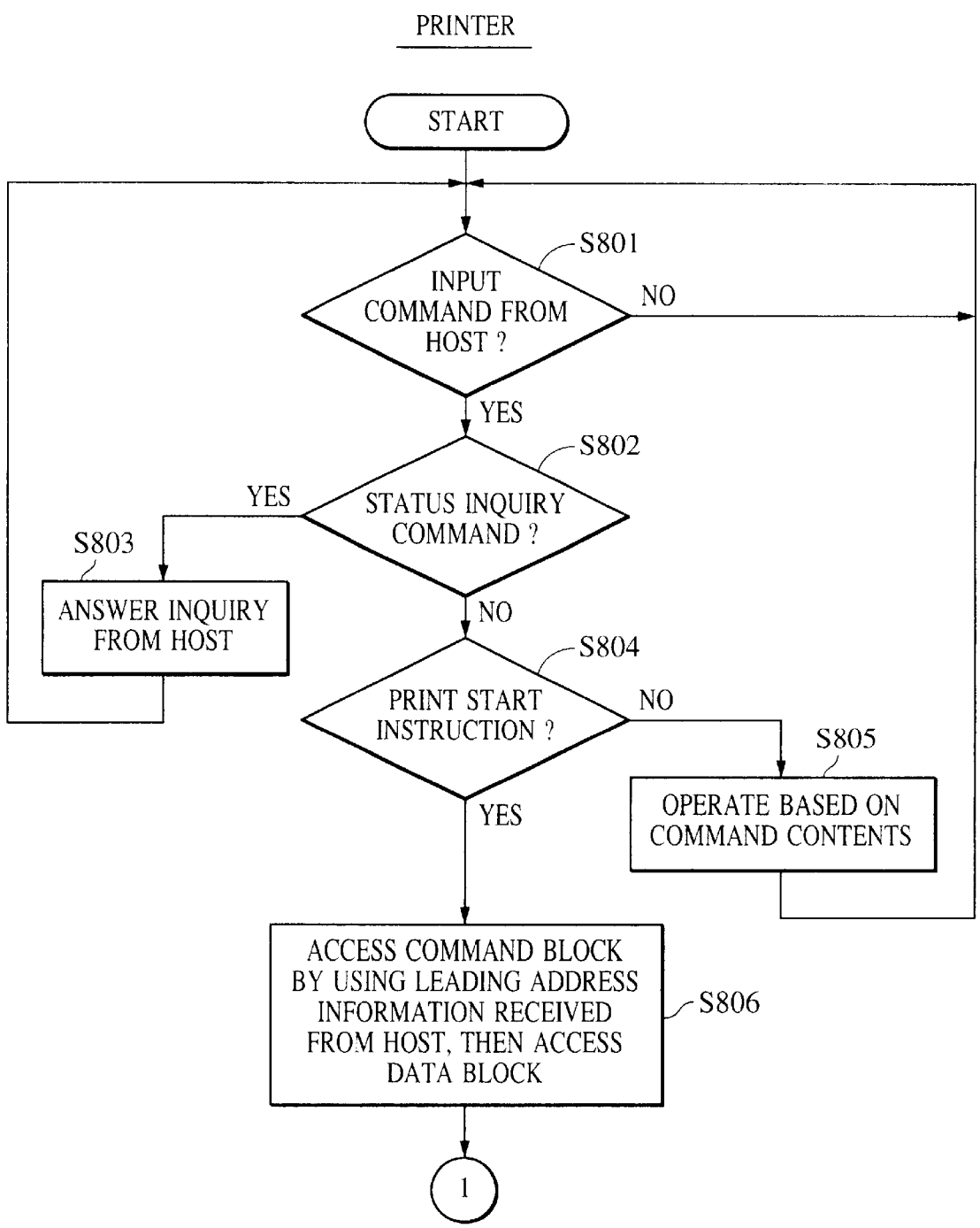
FIG. 8 is a flow chart showing a flow of an operation of a printing apparatus of the printing system according to the embodiment of the present invention.
Figure 9:
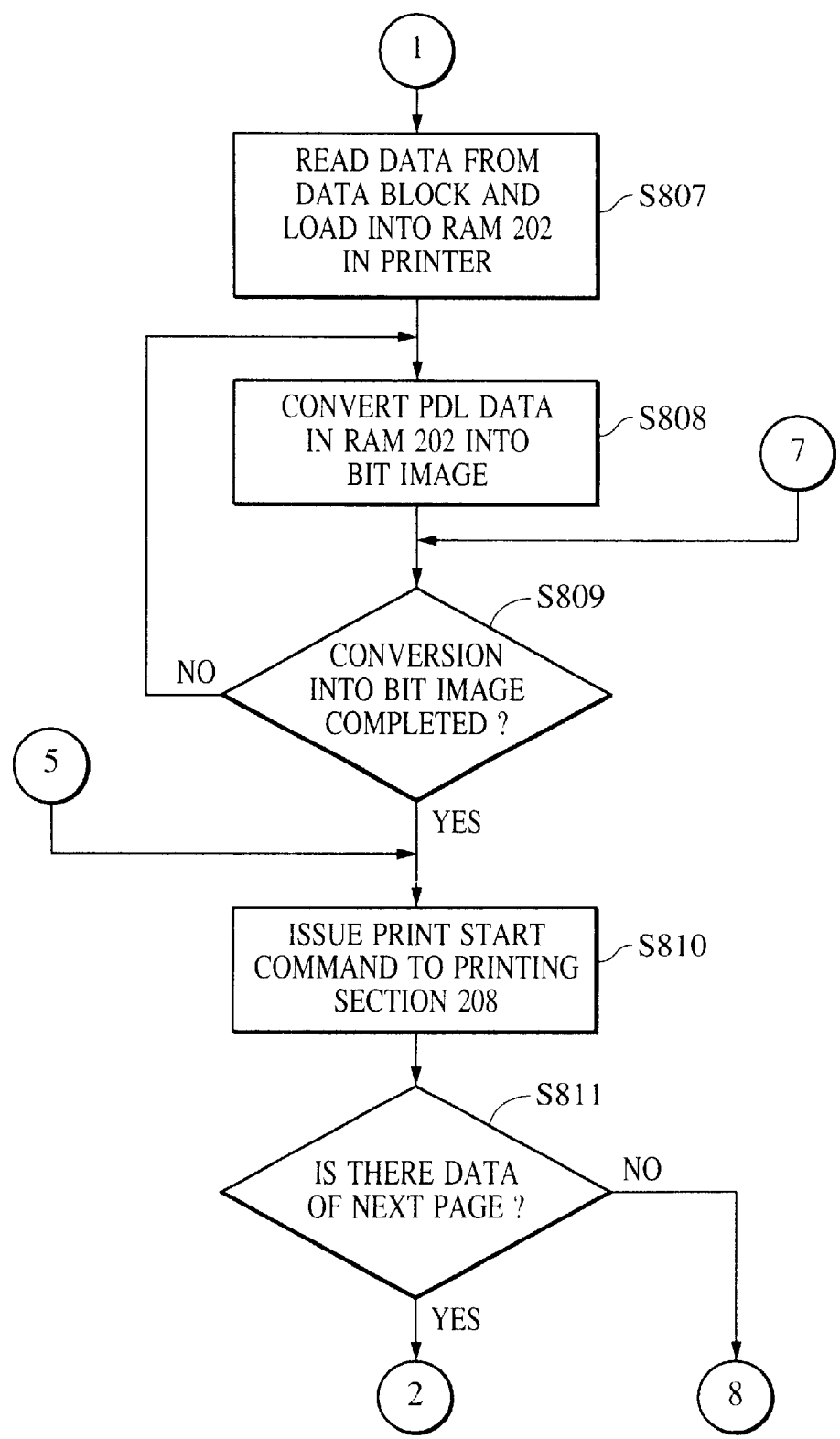
FIG. 9 is a flow chart showing a flow of the operation of the printing apparatus of the printing system according to the embodiment of the present invention.
Figure 10:
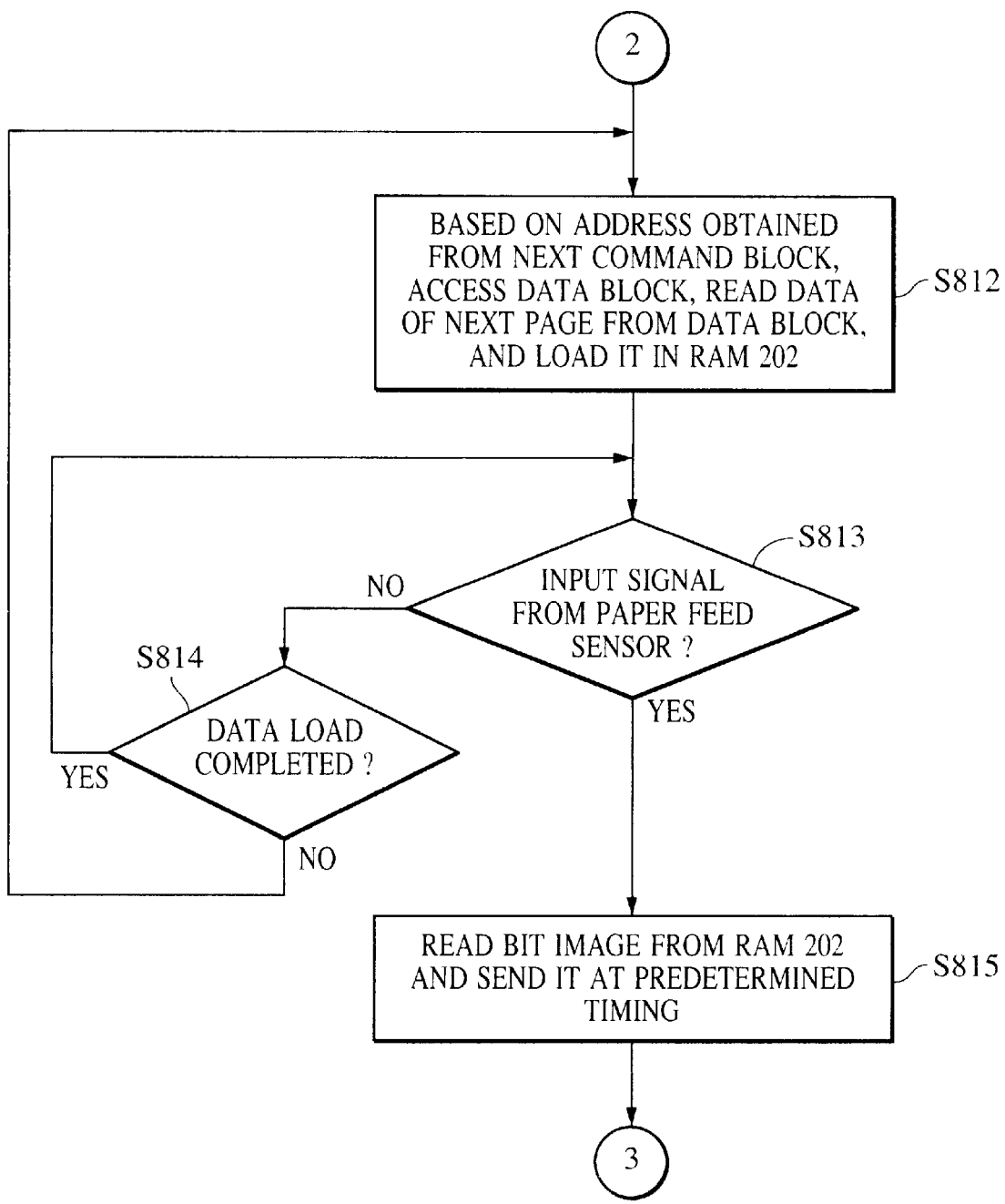
FIG. 10 is a flow chart showing a flow of the operation of the printing apparatus of the printing system according to the embodiment of the present invention.
Figure 11:
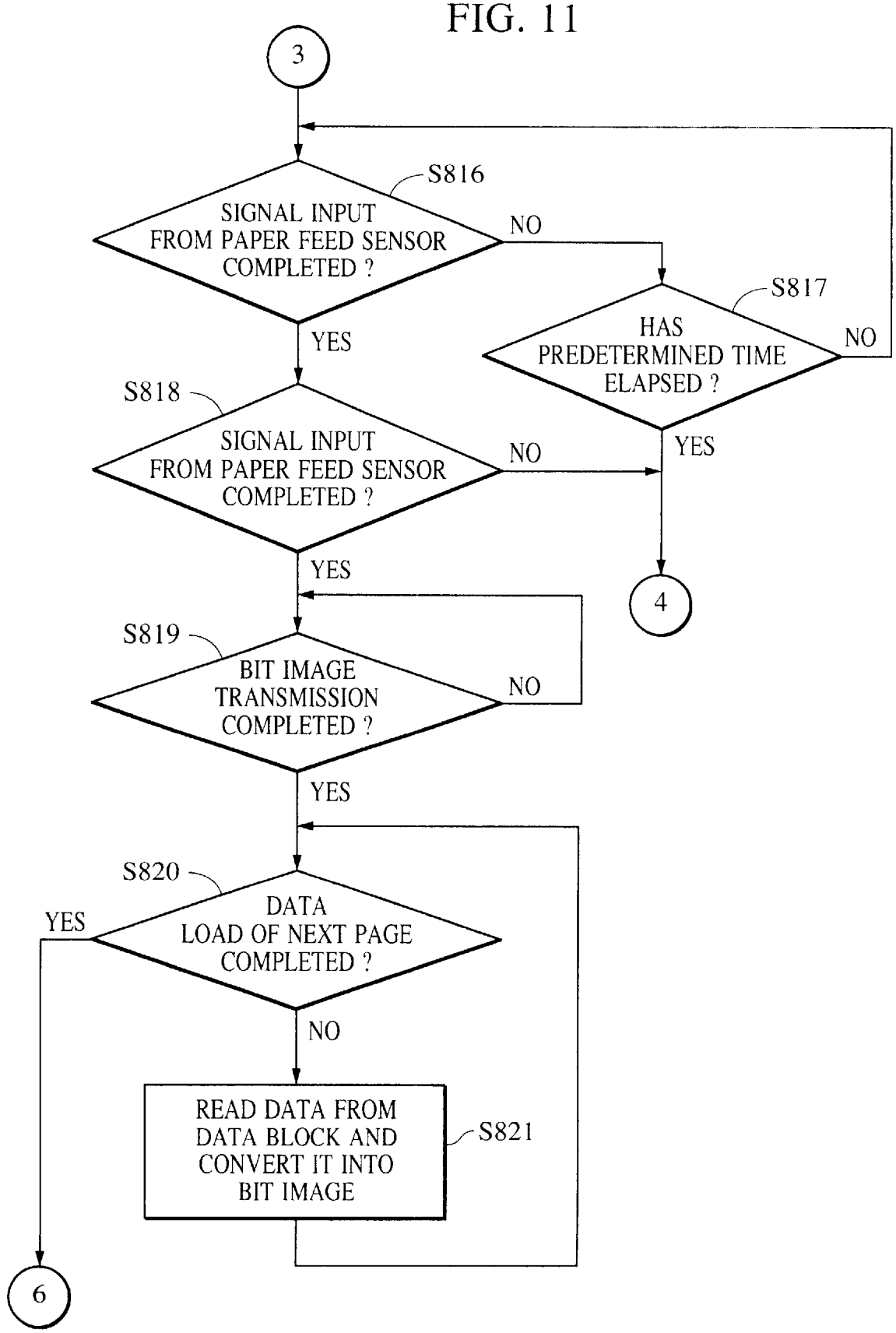
FIG. 11 is a flow chart showing a flow of the operation of the printing apparatus of the printing system according to the embodiment of the present invention.
Figure 12:
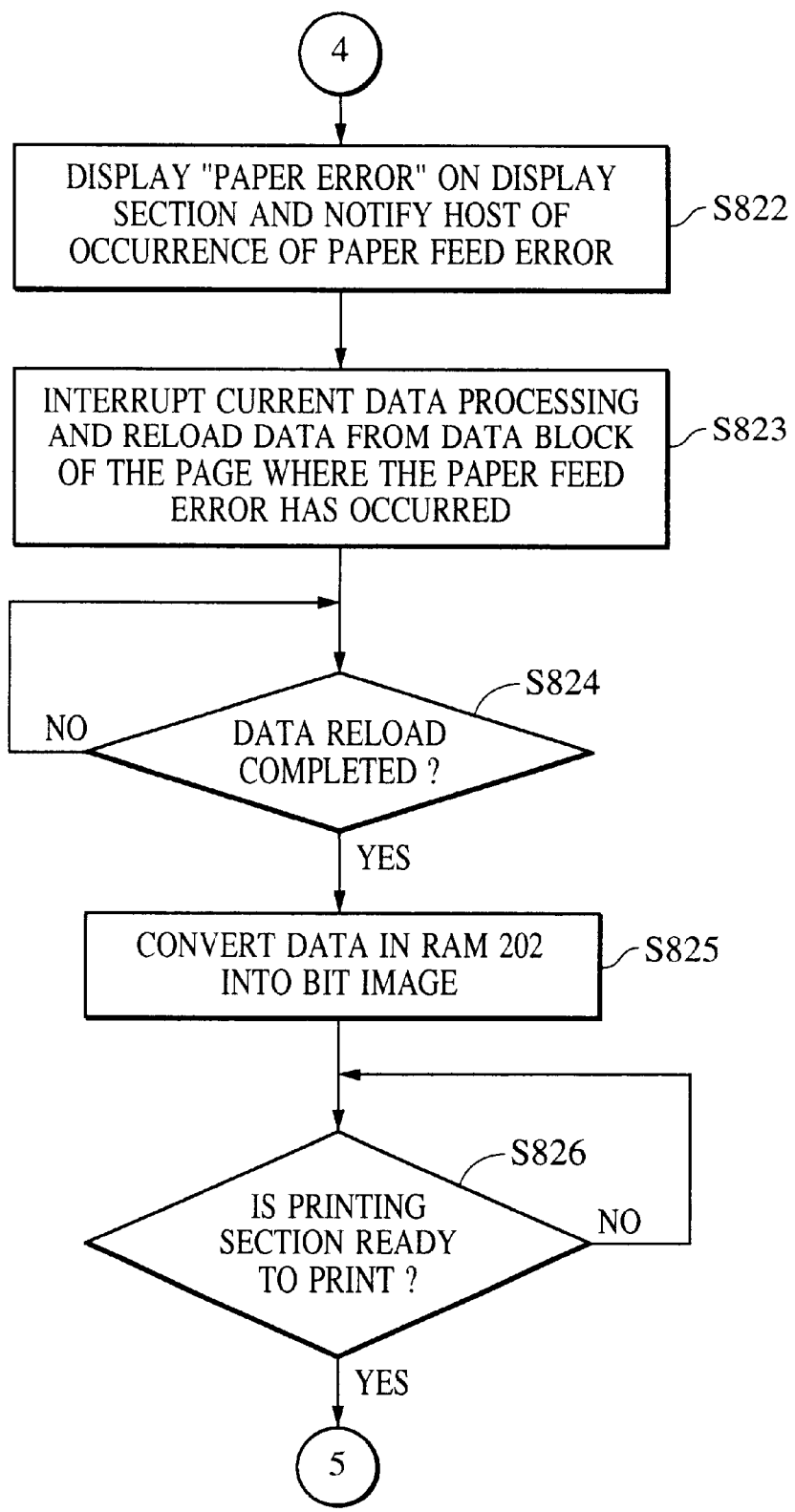
FIG. 12 is a flow chart showing a flow of the operation of the printing apparatus of the printing system according to the embodiment of the present invention.
Figure 13:
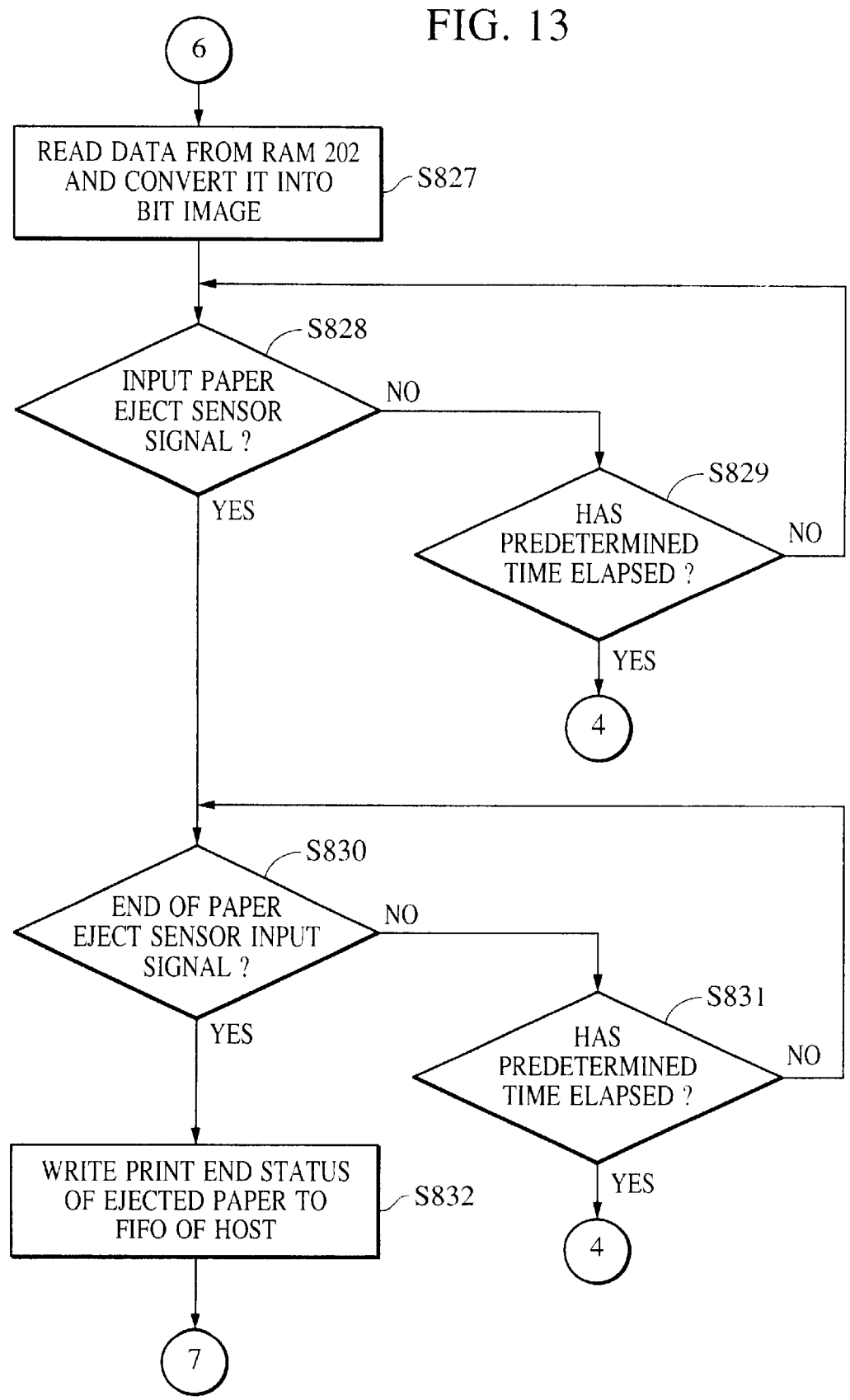
FIG. 13 is a flow chart showing a flow of the operation of the printing apparatus of the printing system according to the embodiment of the present invention.
Figure 14:
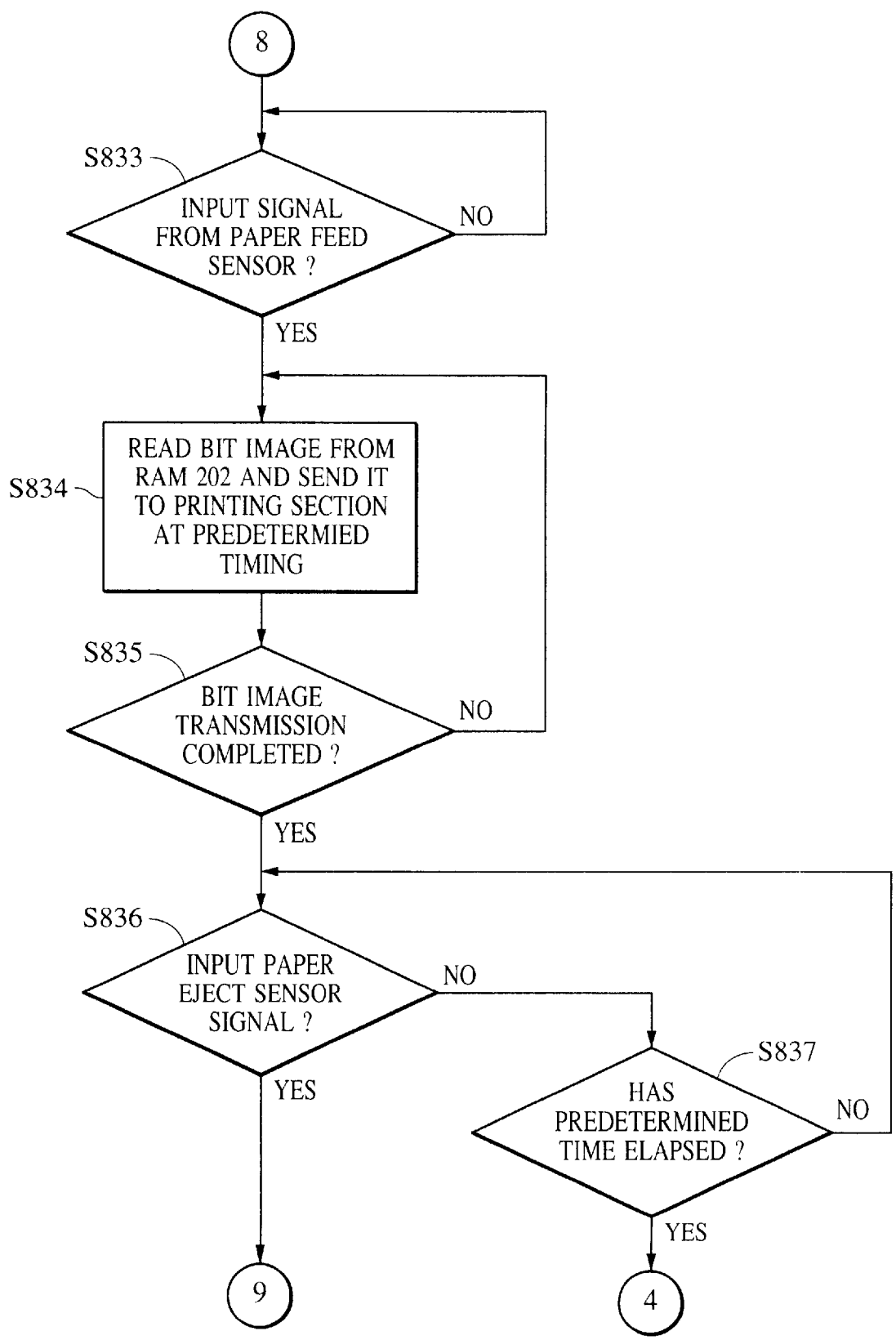
FIG. 14 is a flow chart showing a flow of the operation of the printing apparatus of the printing system according to the embodiment of the present invention.
Figure 15:
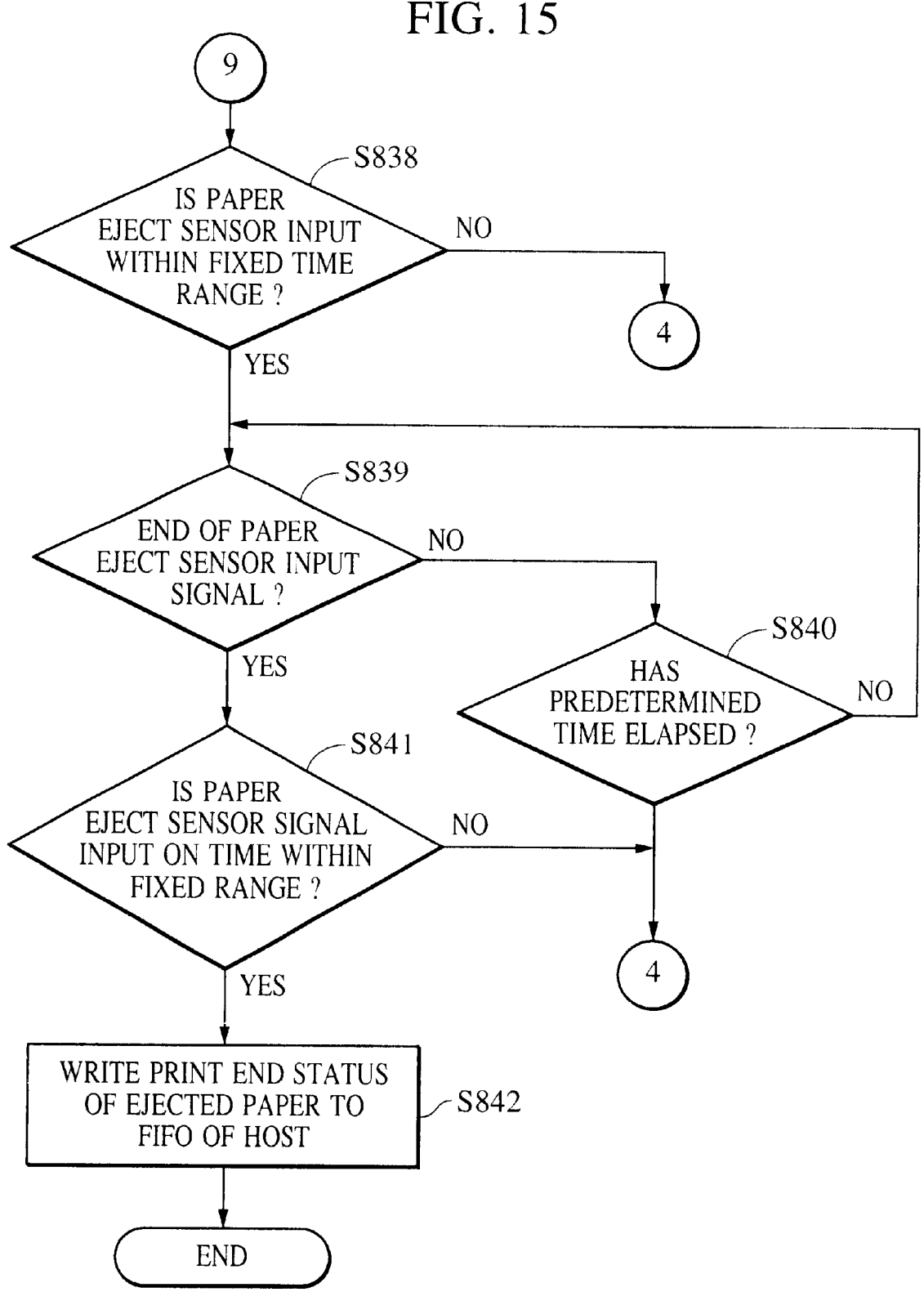
FIG. 15 is a flow chart showing a flow of the operation of the printing apparatus of the printing system according to the embodiment of the present invention.

FIG. 7 shows a print start command and a print end status in the printing system in accordance with the embodiment of the invention, wherein FIG. 7A is a schematic representation illustrating the print start command issued from the PC 101 to the printer 103, and FIG. 7B is a schematic representation illustrating the print end status supplied from the printer 103 to the PC 101. Referring to FIG. 7A, reference numeral 701 denotes the print start command, reference numeral 702 denotes a leading address of command block, and reference numeral 703 denotes an end code. Referring to FIG. 7B, reference numeral 704 denotes the print end status, reference numeral 705 denotes a page number, and reference numeral 706 denotes an end code.

The operations of the PC 101 and the printer 103 constituting the printing system in accordance with the embodiment of the invention configured as described above will be explained with reference to FIG. 1 through FIG. 17, and FIG. 35. FIG. 8 through FIG. 15 show flow charts illustrating the flow of the operation of the printer 103 of the printing system in accordance with the embodiment of the invention, and FIG. 16 and FIG. 17 show flow charts illustrating the flow of the operation of the PC 101 of the printing system in accordance with the embodiment of the invention.

First, the operation of the PC 101 of the printing system will be described with reference to FIG. 16 and FIG. 17. The CPU 305 of the PC 101 creates text by using an application program (step S1601). The CPU 305 creates the aforesaid text as text data for printing in response to a print instruction (step S1602) from the control section or keyboard 302, and stores the created text data in the memory 304 (step S1603). When the text data has been stored in the memory 304 and prepared for printing, the CPU 305 of the PC 101 issues an inquiry to the printer 103 via the IEEE 1394 serial bus to ask whether the printer 103 is ready for printing (step S1604). If the printer 103 is not ready, then a message to that effect is displayed on the display section 301 (step S1606). If the printer 103 is ready, then the PC 101 sends out the print start instruction and a leading address of the leading command block 401 to the printer 103 (step S1607).

Thereafter, when the PC 101 receives a print end status of the pertinent page from the printer 103 upon completion of printing by the printer 103 (step S1608), if there is a next page to be printed (step S1609), the PC 101 creates and connects a command block and a data block for a next page to be printed (step S1611). For a last page, the PC 101 adds end codes before and after a command block (step S1610).

Then, as soon as the PC 101 receives print end statuses of all pages from the printer 103 (step S1611), it terminates the processing.

Referring now to FIG. 8 through FIG. 15, the operation of the printer 103 of the printing system will be described. When the CPU 204 of the printer 103 receives a command from the PC 101 (step S801), it determines whether the received command is the command inquiring about the status of the printer 103 (step S802). If the CPU 204 determines that the received command inquires about the status of the printer 103, then it responds to the inquiry from the PC 101 (step S803). If the CPU 204 determines that the received command does not inquire about the status of the printer 103, then the CPU 204 further determines whether it is a print start instruction from the PC 101 (step S804). If the command is not the print start instruction from the PC 101, then the printer 103 performs operation in accordance with the contents of the command (step S805) and returns to step S801.

When the CPU 204 of the printer 103 receives the print start instruction from the PC 101, the CPU 204 accesses the command block 401 in the memory 304 of the PC 101 via the IEEE 1394 serial bus on the basis of leading address information of a command block that comes with a command. Since the write command has been written to the command block 401, the printer 103 recognizes the print request and further accesses the data block 406 from the leading address information of the data block in the command block 401 (step S806). The printer 103 reads text data on the first page of the data block 406 and loads it into the code memory area 202a in the RAM 202 of the printer 103 via the IEEE 1394 serial bus (step S807).

When the text data of the one page has been read from the data block 406, the CPU 204 of the printer 103 reads text data, namely, page description language (PDL) data stored in the code memory area 202a, analyzes the contents to convert it into a bit image, and stores the bit image in the bit image data memory area 202b of the RAM 202 (step S808). Upon completion of the conversion into the bit image (step S809), the CPU 204 sends the print start command to the printing section 208 (step S810). The printing section 208 that has received the print start command begins rotating the rotating mirror 502 and the photoconductive drum 504 and also actuates the pickup roller 507 to feed print paper to the printing section 208 composed of the aforesaid photoconductive drum 504, the transferring device 505, the developing device 508, the fixing device 509, etc.

The CPU 204 accesses the command block 402 from the leading address information of the next command block of the third section of the command block 401, and reads the text data of the second page from the data block 407 in the same procedure and starts loading it into the code memory area 202a of the RAM 202 (step S812).

When the print paper reaches the position of the paper feed sensor 515 (see FIG. 35A), the feed sensor 515 sends a detection signal to the CPU 204 (step S813). Using this detection signal from the paper feed sensor 515 as a timing signal, the CPU 204 reads out bit image data from the RAM 202 at a timing by which the leading edge of the paper pulled out from the paper holder 506 and fed at a constant speed coincides with the leading edge of a latent image written to the photoconductive drum 504 by the semiconductor laser 501, and sends the read bit image data to the printing section 208 (step S815).

Furthermore, the CPU 204 measures the time from the moment the detection signal from the paper feed sensor 515 turns ON to the moment the signal turns OFF (step S816). As long as the paper is fed normally, the paper is fed at the constant speed, so that the paper passes in front of the paper feed sensor 515 at a fixed time. Accordingly, the time from the moment the detection signal from the paper feed sensor 515 turns ON to the moment the signal turns OFF stays constant. If the signal of the paper feed sensor 515 does not turn OFF after the fixed time (step S817) or turns OFF after more than the fixed time passes (step S819), then it is possible that a paper feed failure has occurred, and an image to be transferred to the paper is accordingly faulty. Corrective measures for coping with the failure will be discussed later; the description will be first given of a case wherein paper has normally passed by the paper feed sensor 515.

Upon completion of reading of the bit image data from the RAM 202 (step S819), if the CPU 204 has not yet finished loading the data of the next page from the data block of the PC 101, then the CPU 204 continues loading the data. When the CPU 204 finally finishes loading the data, it reads out the command data from the RAM 202 and converts the command data into a bit image and also feeds paper for printing the next page (step S827, FIG. 35D).

The paper onto which an image has been transferred by the transferring device 505 is subjected to a fixing process by the fixing device 509, then the paper passes in front of the paper eject sensor 516 (FIG. 35D). Since the paper is fed at the constant speed as mentioned above, the time required for the paper to pass by the paper feed sensor 515 and reach the position in front of the paper eject sensor 516 is fixed. Hence, if the signal of the paper eject sensor 516 does not turn ON after the fixed time passes and the paper reaches the position in front of the paper eject sensor 516 (step S829) or the signal does not turn OFF within a fixed time after the signal of the paper eject sensor 516 turns ON (step S831), then a possibility of occurrence of a paper feed failure is considered. Thus, the program proceeds to a routine for processing a paper error. However, the processing of the routine will be discussed later; a description will be first given of a case wherein the paper normally passes by the paper eject sensor 516 (step S830).

In this case, it can be determined that the page on the paper has been properly printed and the printed paper has been properly ejected. Therefore, the CPU 204 of the printer 103 writes a status reporting to the PC 101 that the page has been normally printed to the FIFO 307 of the PC 101 (step S832), and returns to the foregoing step S809 to continue the processing for the next page.

Upon receipt of the aforesaid end status (the foregoing step S1608), if there is text data for the next page, the PC 101 first rewrites the leading address data of the data block (406 in this case) of the command block 401 to "FFFFFFFF" indicating that no information is present as shown in FIG. 5, then connects the command block 410 of the next page to the command block 404, and loads the text data itself to a position (406 in this case) where there was the text data of the page for which the end status has been received. Thus, when the PC 101 receives an end status from the printer 103, it rewrites the data block address information of the command block of the page to "FFFFFFFF", connects the command block of the next page to a point immediately before an end code, and writes the text data to an empty data block for which an end status has been received. The PC 101 repeats this series of operation to a last page.

Likewise, the printer 103 repeats the foregoing series of operations until the data indicated by an address of the next command block in the command blocks indicates an end code, which means that the page carrying the end code is the last page, and the printer 103 terminates the operation when the last page has been ejected.

An operation performed when a paper feed error has been detected in the printer 103 will now be described.

If the CPU 204 detects a paper feed error from a signal from the paper eject sensor 516, it interrupts the printing operation of the printing section 208, displays a message "PAPER ERROR" on the control/display section 203, and also notifies the PC 101 of the occurrence of the paper feed error (step S822). The PC 101 receives the foregoing status and displays a message that indicates that the printer has incurred a paper feed error, on the display section 301. At this time, the printer 103 is naturally in a not-ready state. In this case, it is very likely that a paper jam has taken place in the printer 103. Therefore, an operator carries out a recovery operation such as removing the paper that has jammed in the printer 103.

The CPU 204 of the printer 103 accesses the PC 101 to read the text data of the page, where the paper error has occurred (the text data is still in the memory of the PC 101 because the print end status has not yet been sent back), from a data block, and reload the text data into the code memory area 202*a* of the RAM 202 (step S823). After completing reloading of the data (step S824), the CPU 204 converts the data of the RAM 202 into a bit image again (step S825), waits until the printer becomes ready (step S826), and performs reprinting.

In the embodiment of the present invention, only the case wherein one-side printing is carried out by the printer 103 has been described. Obviously, however, the present invention is applicable also to a case wherein double-side printing is carried out. In this case, printing is performed, for example, in the following order: a first page (the front side of a first sheet)→a third page (the front side of a second sheet)→a second page (the back side of the first sheet)→a fourth page (the back side of the second sheet). If, for example, the first sheet jams, then text data of the first page and the second page will be reloaded from the PC 101 to reprint them.

Thus, according to the printing system in accordance with the embodiment of the present invention, the PC 101 has the IEEE 1394 I/F section 306 that communicates with the printer 103, the memory 304 which can be accessed by the printer 103 and in which text data is stored, and the CPU 305 that notifies the printer 103 of an information block including address information of text data, clears the text data of a page, which has been printed, upon receipt of a print end status, and loads text data of a page to be printed next to the cleared position. In addition, the printer 103 has the IEEE 1394 I/F section 201 that communicates with the PC 101, the printing section 208 that performs printing on a recording medium such as paper, and the CPU 204 that reads text data stored in the memory 304 of the PC 101 on the basis of an address of an information block which includes address information of text data notified by the PC 101, causes the printing section 208 to perform printing, and sends a report on completion of the printing of the text data and also information regarding a page finished with printing back to the PC 101 as a status. Hence, the printing system in accordance with the embodiment of the present invention provides operations and advantages set forth below.

In the above configuration, text data is stored in the memory 304 of the PC 101, and the text data is read from the memory 304 of the PC 101 to carry out printing when implementing printing by the printer 103. With this arrangement, the capacity of a receiving buffer memory of the printer 103 can be minimized. Furthermore, if a jam occurs, the printer 103 is able to directly read text data for a recovery from the jam from the memory 304 on the PC 101 without involving the PC 101, permitting an extremely small burden on the PC 101. Moreover, upon completion of printing on a page, the print end is notified to the PC 101 from the printer 103. Hence, the PC 101 does not have to retain text data for a long time. The area for a page finished with printing may be used for writing the next text data to be printed by the printer 103, or may be used for other purposes if no additional text data is present.

In other words, the embodiment of the present invention is advantageous in that a highly efficient printing system can be achieved that requires an extremely small capacity of a receiving buffer memory of the printer 103 and also causes an extremely small burden on the PC 101.

The printing system in accordance with the embodiment of the invention has been configured to connect the scanner 102, the printer 103, the digital camera 104, the HDD 105, etc., to the PC 101 via the IEEE 1394 interface serial bus 106. The present invention, however, is not limited to the above system configuration but may have a configuration wherein other devices are connected as necessary.

The present invention may be applied to a system constituted by a plurality of devices or to a system constituted by single equipment. It is needles to say that the present invention is achieved by supplying a storage medium, in which program codes of software for implementing the features of the embodiment set forth above have been stored, to a system or a printing system, so that the system or a computer (CPU or an MPU) of an apparatus reads and executes the program codes stored in the storage medium.

In this case, the program codes themselves read from the storage medium will implement the features of the aforesaid embodiment, and therefore the storage medium in which the program codes have been stored will constitute the present invention.

Examples of the storage medium used for supplying the program codes include a floppy disk, a hard disk, an optical disk, a magneto-optical disk, a CD-ROM, a CD-R, a magnetic tape, a nonvolatile memory card, and a ROM.

Furthermore, it is obvious that the present invention also includes a case wherein an OS or the like running on a computer performs a part or all of actual processing in accordance with instructions of the aforesaid program codes so as to implement the features of the foregoing embodiment by the processing, in addition to the case wherein the features of the foregoing embodiment are implemented by executing the program codes read by a computer.

It is further obvious that the present invention includes a case wherein the program codes read from a storage medium are written to a memory provided in a feature expansion board inserted in a computer or a feature expansion unit connected to a computer, then a CPU or the like provided in the feature expansion board or the feature expansion unit carries out a part or all of actual processing in accordance with instructions of the program codes so as to implement the features of the foregoing embodiment by the processing.

Thus, according to the present invention, text data is stored in storing means of a host apparatus, and print data is read from the storing means of the host apparatus to perform printing by a printing apparatus. This arrangement requires an extremely small capacity of a receiving buffer memory of the printing apparatus. Furthermore, if a jam occurs in the printing apparatus, print data for a recovery from the jam can be directly read from the storing means of the host apparatus without involving the host apparatus, causing an extremely small burden on the host apparatus. This provides an advantage in that a highly efficient printing system can be achieved that requires an extremely small capacity of a receiving buffer memory of the printing apparatus and also causes an extremely small burden on the host apparatus.

There is another advantage in addition to the advantage described above. Upon completion of printing on a page, a print end is notified to the host apparatus from the printing apparatus. Hence, the host apparatus does not have to retain print data for a long time as it used to. Moreover, the area for a page finished with printing may be used for writing the next print data to be printed by the printing apparatus, or may be used for other purposes if no additional text data is present.

A print control method is read from a storage medium and implemented by a printing system, text data is stored in storing means of a host apparatus, and print data is read from the storing means of the host apparatus to perform printing by a printing apparatus. This arrangement requires an extremely small capacity of a receiving buffer memory of the printing apparatus. Furthermore, if a jam occurs in the printing apparatus, print data for a recovery from the jam can be directly read from the storing means of the host apparatus without involving the host apparatus, causing an extremely small burden on the host apparatus. This provides an advantage in that a highly efficient printing system can be achieved that requires an extremely small capacity of a receiving buffer memory of the printing apparatus and also causes an extremely small burden on the host apparatus.

What is claimed is:

1. A printing apparatus capable of communicating with a host apparatus, said printing apparatus comprising:
    reception means for receiving an information block including address information transmitted from the host apparatus, the address information corresponding to a location where print data to be printed by said printing apparatus is stored in a memory of the host apparatus;
    load means for reading the print data from the memory of the host apparatus, based on the address information, and loading the print data into a memory of said printing apparatus; and
    reload means for reading the print data from the memory of the host apparatus, based on the address information, and reloading the print data of a page at which a paper feed error has occurred into the memory of said printing apparatus, when the paper feed error has occurred.

2. A printing apparatus according to claim 1, further comprising:
    communicating means for communicating with the host apparatus; and
    printing means for printing on a recording medium the print data obtained from the host apparatus,
    wherein said load means obtains the print data stored in the host apparatus based on the address information included in the information block, which is transmitted to said printing apparatus via said communicating means, and
    wherein the information block causes said load means to control said printing means to perform printing of the print data obtained from the host apparatus.

3. A printing apparatus according to claim 2, wherein said load means includes notification means for sending a report indicating that printing of the print data has been completed, and for sending information regarding a page on which printing has been completed back to the host apparatus as a printing-complete status via said communicating means, and
    the host apparatus clears print data of the page on which printing has been completed upon receipt of the printing-complete status via said communicating means, and loads, at a cleared position, print data of a next page to be printed, if there is a next page to be printed.

4. A printing apparatus according to claim 3, wherein, upon receipt of the printing-complete status via said communicating means, the host apparatus retains print data other than the print data of the page on which printing has been completed.

5. A printing apparatus according to claim 2 or claim 3, wherein said communicating means performs communication that conforms with an IEEE 1394 interface standard.

6. A printing system comprising:
    a printing apparatus;
    a host apparatus; and
    a communication interface adapted to enable said printing apparatus and said host apparatus to communicate with each other, wherein
    said host apparatus includes:
        storing means, accessible by said printing apparatus, for storing print data, and
        host control means for providing said printing apparatus with address information of the print data, and
    said printing apparatus includes:
        load means for reading the print data stored in the storing means of said host apparatus, based on the address information, and loading the print data into a memory of said printing apparatus; and
        reload means for reading the print data from the storing means of said host apparatus, based on the address information, and reloading the print data of a page at which a paper feed error has occurred into the memory of said printing apparatus, when the paper feed error has occurred.

7. A printing system according to claim 6,
    wherein said host apparatus further includes host communicating means for communicating with said printing apparatus,
    wherein said printing apparatus further includes print communicating means for communicating with said host apparatus, and printing means for printing the print data obtained from said host apparatus on a recording medium, and
    wherein the load means obtains the print data stored in the storing means of said host apparatus based on the address information, which is included in an information block provided by the host apparatus via the print communicating means, and controls the printing means to perform printing of the print data obtained from said host apparatus.

8. A printing system according to claim 7, wherein
    the load means includes notification means for sending a report indicating that printing of the print data has been completed, and for sending information regarding a page on which printing has been completed to said host apparatus as a printing-complete status via the print communicating means, and
    the host control means clears print data of the page on which printing has been completed from the storing means upon receipt of the printing-complete status via the host communicating means, and loads at a cleared position in the storing means print data of a next page to be printed, if there is a next page to be printed.

9. A printing system according to claim 8, wherein, upon receipt of the printing-complete status via the host communicating means, the host control means retains, in the storing means, print data other than the print data of the page on which printing has been completed.

10. A printing system according to claim 7 or claim 8, wherein the host communicating means and the print communicating means perform communication that conforms with an IEEE 1394 interface standard.

11. A printing system according to claim 6 or claim 7, further comprising:
   an image input device such as a scanner,
   an image sensing device such as a digital camera, and
   a storing device such as a hard,
   wherein said image input device, said image sensing device, and said storing device are connected to said host apparatus via an IEEE 1394 interface.

12. A print control method applied to a printing system comprising a printing apparatus, a host apparatus, and a communication interface adapted to enable the printing apparatus and the host apparatus to communicate with each other, said method comprising:
   at the host apparatus:
      a storing step of storing print data in storing means accessible by the printing apparatus, and
      a host control step of providing the printing apparatus with address information of the print data; and
   at the printing apparatus:
      a load step of reading the print data stored in the storing means of the host apparatus, based on the address information, and loading the print data into a memory of the printing apparatus; and
      a reload step of reading the print data from the storing means of the host apparatus, based on the address information, and reloading the print data of a page at which a paper feed error has occurred into the memory of the printing apparatus, when the paper feed error has occurred.

13. A print control method according to claim 12, further comprising:
   at the host apparatus a host communication step of performing communication with the printing apparatus; and
   at the printing apparatus:
      a print communication step of performing communication with the host apparatus, and
      a printing step of printing on a recording medium the print data obtained from the host apparatus,
   wherein, in said load step, the print data stored in the storing means of the host apparatus is obtained based on the address information, which is included in an information block provided by the host apparatus via said print communication step, and
   wherein said load step controls performance of said printing step.

14. A print control method according to claim 13, wherein, in said load step, a report indicating that printing of the print data has been completed and information regarding a page on which printing has been completed are sent to the host apparatus via said print communication step as a printing-complete status, and, in said host control step, print data of the page on which printing has been completed is cleared from the storing means upon receipt of a printing-complete status via said host communication step, and print data of a next page to be printed is loaded at a cleared position in the storing means, if there is a next page to be printed.

15. A print control method according to claim 14, wherein print data other than print data of the page on which printing has been completed is retained in the storing means in said host control step upon receipt of the printing-complete status via said host communicating step.

16. A print control method according to claim 13, claim 14, or claim 15, wherein communication that conforms to an IEEE 1394 interface standard is performed in said host communication step and said print communication step.

17. A print control method according to claim 12, claim 13, claim 14, or claim 15, wherein, in addition to the printing apparatus, at least one of an image input device such as a scanner, an image sensing device such as a digital camera, and a storing device such as a hard disk is connected to the host apparatus via an IEEE 1394 interface.

18. A computer-readable storage medium storing a program for implementing a print control method applied to a printing system comprising a printing apparatus, a host apparatus, and a communication interface adapted to enable the printing apparatus and the host apparatus to communicate with each other and the program, the program comprising:
   code for a storing step of storing print data in storing means of the host apparatus that is accessible by the printing apparatus;
   code for a host control step of providing the printing apparatus with address information of the print data; and
   code for a load step of reading the print data stored in the storing means of the host apparatus, based on the address information, and loading the print data into a memory of the printing apparatus; and
   code for a reload step of reading the print data from the storing means of the host apparatus, based on the address information, and reloading the print data of a page at which a paper feed error has occurred into the memory of the printing apparatus, when the paper feed error has occurred.

19. A printing apparatus according to claim 1, further comprising printing means for printing on paper the print data obtained from the host apparatus.

20. A printing apparatus according to claim 1, further comprising:
   means for detecting whether a feed error has occurred; and
   means for reloading data of a page at which a feed error has occurred when the feed error is detected by said means for detecting.

21. A printing system according to claim 6, wherein said printing apparatus further comprises:
   means for detecting whether a feed error has occurred; and
   means for reloading data of a page at which a feed error has occurred when the feed error is detected by the means for detecting.

22. A print control method according to claim 12, further comprising:
   a detection step of detecting whether a feed error has occurred; and
   a data reload step of reloading data of a page at which a feed error has occurred when the feed error is detected in said detection step.

23. A storage medium according to claim 18, wherein the program further comprises:
  code for a detection step of detecting whether a feed error has occurred; and
  code for a data reload step of reloading data of a page at which a feed error has occurred when the feed error is detected in the detection step.

24. A printing apparatus according to claim 4, wherein said communicating means performs communication that conforms with an IEEE 1394 interface standard.

25. A printing system according to claim 9, wherein the host communicating means and the print communicating means perform communication that conforms with an IEEE 1394 interface standard.

26. A printing system according to claim 8, wherein, in addition to said printing apparatus, at least one of an image input device such as a scanner, an image sensing device such as a digital camera, and a storing device such as a hard disk is connected to said host apparatus via an IEEE 1394 interface.

27. A printing system according to claim 9, wherein, in addition to said printing apparatus, at least one of an image input device such as a scanner, an image sensing device such as a digital camera, and a storing device such as a hard disk is connected to said host apparatus via an IEEE 1394 interface.

28. A printing system according to claim 10, wherein, in addition to said printing apparatus, at least one of an image input device such as a scanner, an image sensing device such as a digital camera, and a storing device such as a hard disk is connected to said host apparatus via an IEEE 1394 interface.

29. A print control method according to claim 16, wherein, in addition to the printing apparatus, at least one of an image input device such as a scanner, an image sensing device such as a digital camera, and a storing device such as a hard disk is connected to the host apparatus via an IEEE 1394 interface.

* * * * *

UNITED STATES PATENT AND TRADEMARK OFFICE
CERTIFICATE OF CORRECTION

PATENT NO. : 6,612,760 B2  Page 1 of 1
DATED : September 2, 2003
INVENTOR(S) : Shigeru Ueda et al.

It is certified that error appears in the above-identified patent and that said Letters Patent is hereby corrected as shown below:

<u>Column 3,</u>
Line 16, "means print," should read -- means, print --.

<u>Column 14,</u>
Line 38, "shows a" should read -- shows --.

<u>Column 20,</u>
Line 63, "operation" should read -- operations --.

<u>Column 22,</u>
Line 27, "needles" should read -- needless --.

<u>Column 25,</u>
Line 18, "hard," should read -- hard disk, --.

Signed and Sealed this

Twentieth Day of January, 2004

JON W. DUDAS
*Acting Director of the United States Patent and Trademark Office*